United States Patent
Kim et al.

(10) Patent No.: US 12,445,834 B2
(45) Date of Patent: Oct. 14, 2025

(54) ELECTRONIC DEVICE PERFORMING WIRELESS COMMUNICATION WITH ACCESSORY DEVICE, AND OPERATING METHOD THEREOF

(71) Applicant: SAMSUNG ELECTRONICS CO., LTD., Suwon-si (KR)

(72) Inventors: Minkyu Kim, Suwon-si (KR); Yoonseok Kang, Suwon-si (KR); Gajin Song, Suwon-si (KR); Junyong Sim, Suwon-si (KR); Youngho Yoon, Suwon-si (KR); Minkyung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 18/215,502

(22) Filed: Jun. 28, 2023

(65) Prior Publication Data
US 2023/0345237 A1    Oct. 26, 2023

Related U.S. Application Data

(63) Continuation of application No. PCT/KR2021/018179, filed on Dec. 3, 2021.

(30) Foreign Application Priority Data

Dec. 31, 2020    (KR) .................. 10-2020-0189421

(51) Int. Cl.
*H04L 9/32*    (2006.01)
*H04L 9/30*    (2006.01)
(Continued)

(52) U.S. Cl.
CPC .............. *H04W 12/04* (2013.01); *H04L 9/30* (2013.01); *H04W 48/10* (2013.01); *H04W 76/10* (2018.02)

(58) Field of Classification Search
CPC ..... H04W 12/04; H04W 76/10; H04W 48/10; H04L 9/30
(Continued)

(56) References Cited

U.S. PATENT DOCUMENTS 7,463,861 B2    12/2008    Eisenbach
7,756,478 B2    7/2010    Eisenbach
(Continued)

FOREIGN PATENT DOCUMENTS

EP    3748900 A1    12/2020
KR    10-1780317 B1    9/2017
(Continued)

OTHER PUBLICATIONS

International Search Report (PCT/ISA/210) issued by the International Searching Authority on Mar. 23, 2022 in International Patent Application No. PCT/KR2021/018179.
(Continued)

*Primary Examiner* — Jeffrey C Pwu
*Assistant Examiner* — Samuel Ambaye
(74) *Attorney, Agent, or Firm* — Sughrue Mion, PLLC

(57) ABSTRACT

The present disclosure provides methods and electronic devices for performing wireless communication with an accessory device. In some embodiments, an electronic device includes a wireless communication circuit, a memory, and a processor. The processor is configured to execute instructions to receive, from at least one server through the wireless communication circuit, a first decryption key. The processor is further configured to receive, from an accessory device through the wireless communication circuit, an advertising packet. At least one portion of the advertising packet is encrypted with a first encryption key. The processor is further configured to decrypt the at least one portion of the advertising packet with the first decryp-
(Continued)

tion key. The processor is further configured to transmit, to the at least one server through the wireless communication circuit, information comprised in the decrypted advertising packet. The first decryption key corresponds to the first encryption key.

20 Claims, 14 Drawing Sheets

(51) Int. Cl.
  *H04W 12/04* (2021.01)
  *H04W 48/10* (2009.01)
  *H04W 76/10* (2018.01)

(58) Field of Classification Search
  USPC .......................................................... 713/171
  See application file for complete search history.

(56) References Cited

U.S. PATENT DOCUMENTS

| | | | |
|---|---|---|---|
| 8,165,525 B2 | 4/2012 | Eisenbach | |
| 9,178,893 B2 | 11/2015 | Miller et al. | |
| 9,351,098 B2 | 5/2016 | Rivera et al. | |
| 9,485,613 B2 | 11/2016 | Pan et al. | |
| 9,565,255 B2 | 2/2017 | Kapoor et al. | |
| 9,641,622 B2 | 5/2017 | Kapoor et al. | |
| 9,838,526 B2 | 12/2017 | Donley et al. | |
| 10,110,722 B2 | 10/2018 | Donley et al. | |
| 10,219,106 B1 | 2/2019 | Lam et al. | |
| 10,219,107 B2 | 2/2019 | Lévêque et al. | |
| 10,271,171 B2 | 4/2019 | Evans et al. | |
| 10,412,540 B2 | 9/2019 | Lévêque et al. | |
| 10,469,991 B2 | 11/2019 | Evans et al. | |
| 10,536,798 B2 | 1/2020 | Lévêque et al. | |
| 10,609,514 B2 | 3/2020 | Evans et al. | |
| 10,965,455 B2 | 3/2021 | Park et al. | |
| 11,606,669 B2 | 3/2023 | Lopatin et al. | |
| 2013/0272134 A1* | 10/2013 | Miller | H04L 63/205 370/328 |
| 2015/0371030 A1 | 12/2015 | Rivera et al. | |
| 2015/0373543 A1 | 12/2015 | Rivera et al. | |
| 2017/0272398 A1* | 9/2017 | Cho | H04L 67/75 |
| 2019/0020751 A1 | 1/2019 | Donley et al. | |
| 2020/0052905 A1 | 2/2020 | Mathias et al. | |
| 2020/0107164 A1 | 4/2020 | Lopatin et al. | |
| 2020/0162895 A1* | 5/2020 | Chakra | H04L 63/107 |
| 2020/0396080 A1* | 12/2020 | Yoo | H04L 9/0631 |
| 2022/0078029 A1 | 3/2022 | Galdo et al. | |
| 2022/0301410 A1* | 9/2022 | Erdmann, IV | H04W 4/021 |

FOREIGN PATENT DOCUMENTS

| | | |
|---|---|---|
| WO | 2013/154861 A1 | 10/2013 |
| WO | 2020/068359 A1 | 4/2020 |
| WO | 2020/214711 A1 | 10/2020 |

OTHER PUBLICATIONS

Written Opinion (PCT/ISA/237) issued by the International Searching Authority on Mar. 23, 2022 in International Patent Application No. PCT/KR2021/018179.

Office Action issued Jun. 9, 2025 by the Korean Patent Office for KR Patent Application No. 10-2020-0189421.

* cited by examiner

ELECTRONIC DEVICE PERFORMING WIRELESS COMMUNICATION WITH ACCESSORY DEVICE, AND OPERATING METHOD THEREOF

CROSS-REFERENCE TO RELATED APPLICATIONS

This application is a continuation application of International Application No. PCT/KR2021/018179, filed on Dec. 3, 2021, which claims priority to Korean Patent Application No. 10-2020-0189421, filed on Dec. 31, 2020, in the Korean Intellectual Property Office, the disclosures of which are incorporated by reference herein in their entireties.

BACKGROUND

1. Field

The present disclosure relates generally to electronic devices, and more particularly, to an electronic device for performing wireless communication with an accessory device and an operating method thereof.

2. Description of Related Art

An accessory device (e.g., a wireless earphone), which may be powered by an embedded battery, may establish a device-to-device connection with a mother terminal (e.g., a portable terminal, a mobile phone, a smart phone), which may control an operation of the accessory device. When the accessory device is lost, the device-to-device connection between the accessory device and the mother terminal may be released. After the device-to-device connection is released, the accessory device may broadcast an advertising packet to establish a device-to-device connection with a neighboring nearby device (e.g., another portable terminal, another mobile phone, another smart phone).

However, an advertising packet may include additional information other than device information of an accessory device. As a result, when an untrusted neighboring device obtains the additional information included in the advertising packet, personal information of a user of the accessory device and/or of the mother terminal may be exposed.

SUMMARY

According to aspects of the present disclosure, personal information of a user of an accessory device may be protected by providing differential information.

According to aspects of the present disclosure, the electronic device may increase the accuracy of identifying a location of the accessory device using additional information (e.g., rich data) included in an advertising packet.

According to an aspect of the present disclosure, an electronic device is provided. The electronic device includes a wireless communication circuit, a memory storing instructions, and a processor communicatively coupled to the wireless communication circuit and the memory. The processor is configured to execute the instructions to receive, from at least one server through the wireless communication circuit, a first decryption key. The processor is further configured to execute the instructions to receive, from an accessory device through the wireless communication circuit, an advertising packet. At least one portion of the advertising packet is encrypted with a first encryption key. The processor is further configured to execute the instructions to decrypt the at least one portion of the advertising packet with the first decryption key. The processor is further configured to execute the instructions to transmit, to the at least one server through the wireless communication circuit, information comprised in the decrypted advertising packet. The first decryption key corresponds to the first encryption key.

According to an aspect of the present disclosure, an electronic device is provided. The electronic device includes a wireless communication circuit, a memory storing instructions, and a processor communicatively coupled to the wireless communication circuit and the memory. The processor is configured to execute the instructions to establish a device-to-device connection with an accessory device. The processor is further configured to execute the instructions to onboard the accessory device to at least one server. The processor is further configured to execute the instructions to register, with the at least one server, an external electronic device meeting a friend condition as a friend device. The processor is further configured to execute the instructions to request, from the accessory device through the device-to-device connection, a first decryption key. The processor is further configured to execute the instructions to transmit, to the at least one server, the first decryption key received from the accessory device. The processor is further configured to execute the instructions to receive, from the at least one server, location information of the accessory device and information comprised in an advertising packet that has been decrypted with the first decryption key, after the device-to-device connection is released.

According to an aspect of the present disclosure, an electronic device is provided. The electronic device includes a wireless communication circuit, a memory storing instructions, and a processor communicatively coupled to the wireless communication circuit and the memory. The processor is configured to execute the instructions to determine that a first electronic device meets a first condition. The processor is further configured to execute the instructions to onboard an accessory device based on an onboarding request received from an external electronic device. The processor is further configured to execute the instructions to receive, from a second electronic device through the wireless communication circuit, a first decryption key. The processor is further configured to execute the instructions to transmit, to the first electronic device through the wireless communication circuit, the first decryption key meeting the first condition. The processor is further configured to execute the instructions to receive, from the first electronic device through the wireless communication circuit, location information of the accessory device and information comprised in an advertising packet, at least a portion of the advertising packet having been decrypted with the first decryption key.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
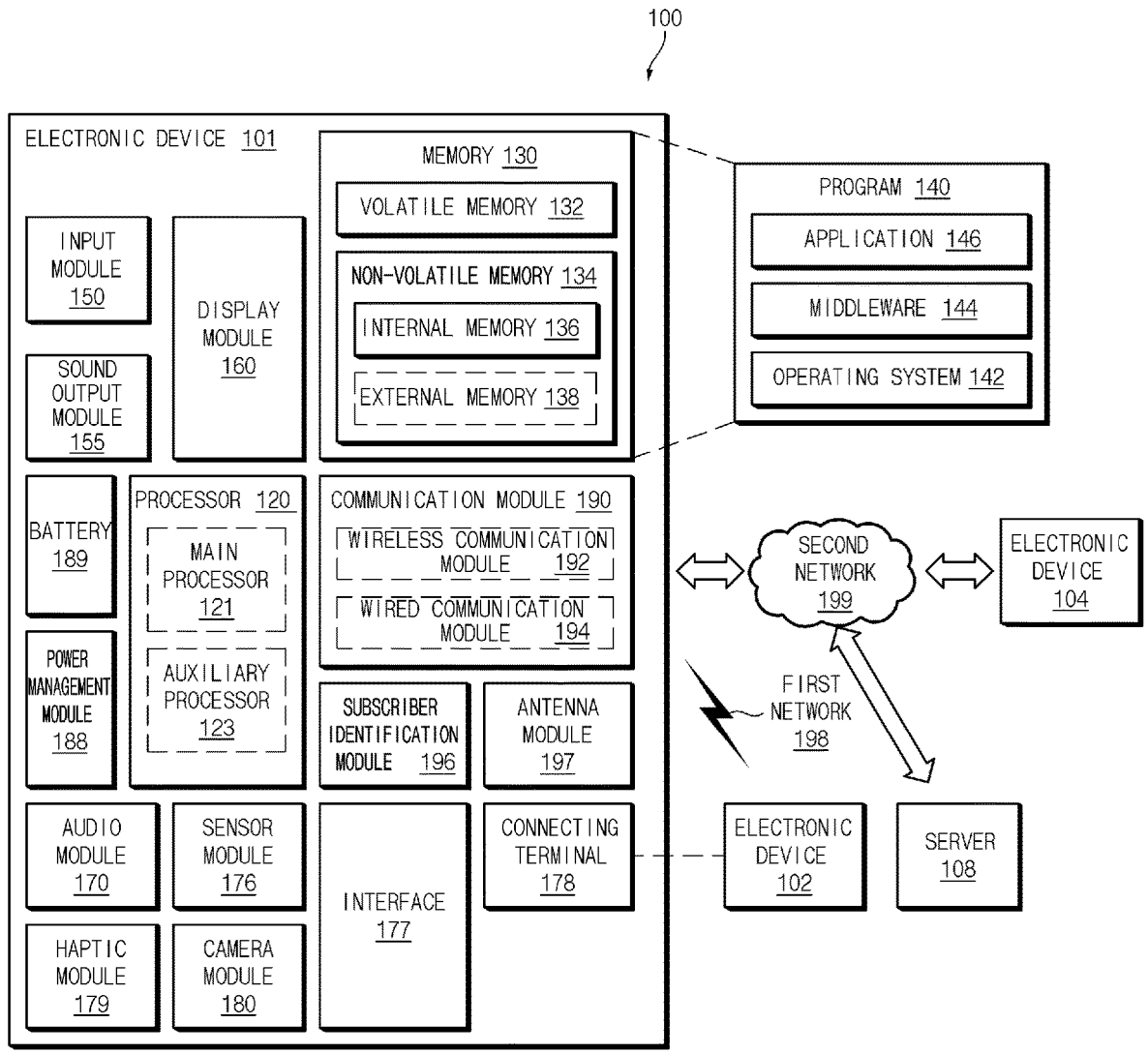
FIG. 1 is a block diagram illustrating an electronic device in a network environment, according to various embodiments.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, various embodiments of the present disclosure are described with reference to the accompanying drawings.

FIG. 1 is a block diagram illustrating an electronic device 101 in a network environment 100, according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an optional or additional embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware and/or software component) of the electronic device 101 coupled with the processor 120, and/or may perform various data processing and/or computations. According to one embodiment, as at least a part of the data processing and/or computation, the processor 120 may store a command and/or data received from another component (e.g., the sensor module 176, the communication module 190) in volatile memory 132, process the command and/or the data stored in the volatile memory 132, and store resulting data in non-volatile memory 134. According to an embodiment, the processor 120 may include a main processor 121 (e.g., a central processing unit (CPU), an application processor (AP)), or an auxiliary processor 123 (e.g., a graphics processing unit (GPU), a neural processing unit (NPU), an image signal processor (ISP), a sensor hub processor, or a communication processor (CP)) that may be operable independently from, or in conjunction with, the main processor 121. For example, when the electronic device 101 includes the main processor 121 and the auxiliary processor 123, the auxiliary processor 123 may be adapted to consume less power than the main processor 121, and/or to be specific to a specified function. The auxiliary processor 123 may be implemented as separate from, or as part of the main processor 121.

The auxiliary processor 123 may control at least some of functions and/or states related to at least one component (e.g., the display module 160, the sensor module 176, the communication module 190) from among the components of the electronic device 101, instead of the main processor 121 while the main processor 121 is in an inactive (e.g., sleep) state, and/or together (e.g., in conjunction) with the main processor 121 while the main processor 121 is in an active state (e.g., executing an application). According to an embodiment, the auxiliary processor 123 (e.g., an image signal processor, a communication processor) may be implemented as part of another component (e.g., the camera module 180, the communication module 190) functionally related to the auxiliary processor 123. According to an optional or additional embodiment, the auxiliary processor 123 (e.g., the neural processing unit) may include a hardware structure that may be specifically designed for artificial intelligence model processing. An artificial intelligence model may be generated by machine learning. Such machine-based learning may be performed (e.g., by the electronic device 101) where the artificial intelligence is performed or via a separate server (e.g., the server 108). Learning algorithms may include, but are not limited to, supervised learning, unsupervised learning, semi-supervised learning, and/or reinforcement learning. The artificial intelligence model may include a plurality of artificial neural network layers. The artificial neural network may be and/or may include a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120, the sensor module 176) of the electronic device 101. The various data may include, but not be limited to, software (e.g., the program 140) and input data and/or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command and/or data to be used by another component (e.g., the processor 120) of the electronic device 101, from the outside (e.g., a user) of the electronic device 101. The input module 150 may include, but not be limited to, a microphone, a mouse, a keyboard, a key (e.g., a button), and a digital pen (e.g., a stylus pen).

The sound output module 155 may output sound signals to the outside of the electronic device 101. The sound output module 155 may include, but not be limited to, a speaker, a receiver, a buzzer, and the like. In an embodiment, the speaker may be used for general purposes, such as playing multimedia or playing record. Alternatively or additionally, the receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, but not be limited to, a display, a hologram device, or a projector and control circuitry to control a corresponding one of the display, hologram device, and projector. According to an embodiment, the display module 160 may include, but not be limited to, a touch sensor adapted to detect a touch, or a pressure sensor adapted to measure the intensity of force incurred by the touch.

The audio module 170 may convert a sound into an electrical signal and/or may convert an electrical signal into a sound. According to an embodiment, the audio module 170 may obtain the sound via the input module 150, and/or output the sound via the sound output module 155 and/or a headphone of an external electronic device (e.g., an electronic device 102) directly (e.g., wiredly) or wirelessly coupled with the electronic device 101.

The sensor module 176 may detect an operational state (e.g., power and/or temperature) of the electronic device 101 or an environmental state (e.g., a state of a user) external to the electronic device 101. Alternatively or additionally, the sensor module 176 may generate an electrical signal and/or data value corresponding to the detected state. According to an embodiment, the sensor module 176 may include, but not be limited to, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, but not be limited to, a high definition multimedia interface (HDMI), a universal serial bus (USB) interface, a secure digital (SD) card interface, and an audio interface.

A connecting terminal 178 may be and/or may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) and/or electrical stimulus which may be recognized by a user via his tactile sensation or kinesthetic sensation. According to an embodiment, the haptic module 179 may include, but not be limited to, a motor, a piezoelectric element, and an electric stimulator.

The camera module 180 may capture still images and/or moving images. According to an embodiment, the camera module 180 may include, but not be limited to, one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, but not be limited to, a primary cell which may not be rechargeable, a secondary cell which may be rechargeable, and/or a fuel cell.

The communication module 190 may support establishing a direct (e.g., wired) communication channel and/or a wireless communication channel between the electronic device 101 and the external electronic device (e.g., the electronic device 102, the electronic device 104, or the server 108) and performing communication via the established communication channel. The communication module 190 may be and/or may include one or more communication processors that may be operable independently from the processor 120 (e.g., the AP) and may support a direct (e.g., wired) communication and/or a wireless communication.

According to an embodiment, the communication module 190 may include a wireless communication module 192 (e.g., a cellular communication module, a short-range wireless communication module, a global navigation satellite system (GNSS) communication module) and/or a wired communication module 194 (e.g., a local area network (LAN) communication module, a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology (e.g., new radio (NR) access technology). The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to potentially achieve a high data transmission rate, for example. The wireless communication module 192 may support various technologies for securing performance on a high-frequency band, such as, but not limited to, beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, and/or U-plane latency (e.g., 0.5 msec or less for each of downlink (DL) and uplink (UL), or a round trip of 1 msec or less) for implementing URLLC.

The antenna module 197 may transmit and/or receive a signal and/or power to and/or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an optional or additional embodiment, the antenna module 197 may include a plurality of antennas (e.g., array antennas). In such embodiments, at least one antenna appropriate for a communication scheme may be used in the communication network, such as the first network 198 or the second network 199, may be selected, for example, by the communication module 190 (e.g., the wireless communication module 192) from the plurality of antennas. The signal and/or the power may then be transmitted and/or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands and/or data may be transmitted and/or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, and/or in response to a request from a user or another device, the electronic device 101, instead of, and/or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome (e.g., result), with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device 101, according to various embodiments, may be and/or may include one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices may not be limited to those described above.

It should be appreciated that various embodiments of the present disclosure and the terms used therein are not intended to limit the technological features set forth herein to particular embodiments and include various changes, equivalents, or replacements for a corresponding embodiment.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that may be readable by a machine (e.g., the electronic device 101). For example, a processor (e.g., the processor 120) of the machine (e.g., the electronic device 101) may invoke at least one of the one or more instructions stored in the storage medium, and execute the instructions, with or without using one or more other components under the control of the processor. As a result, the machine may be operated to perform at least one function according to the at least one instruction invoked. The one or more instructions may include a code generated by a complier and/or a code executable by an interpreter. The machine-readable storage medium may be provided in the form of a non-transitory storage medium. As used herein, the term "non-transitory" may refer to the storage medium being a tangible device, and may not include a signal (e.g., an electromagnetic wave). However, this term may not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
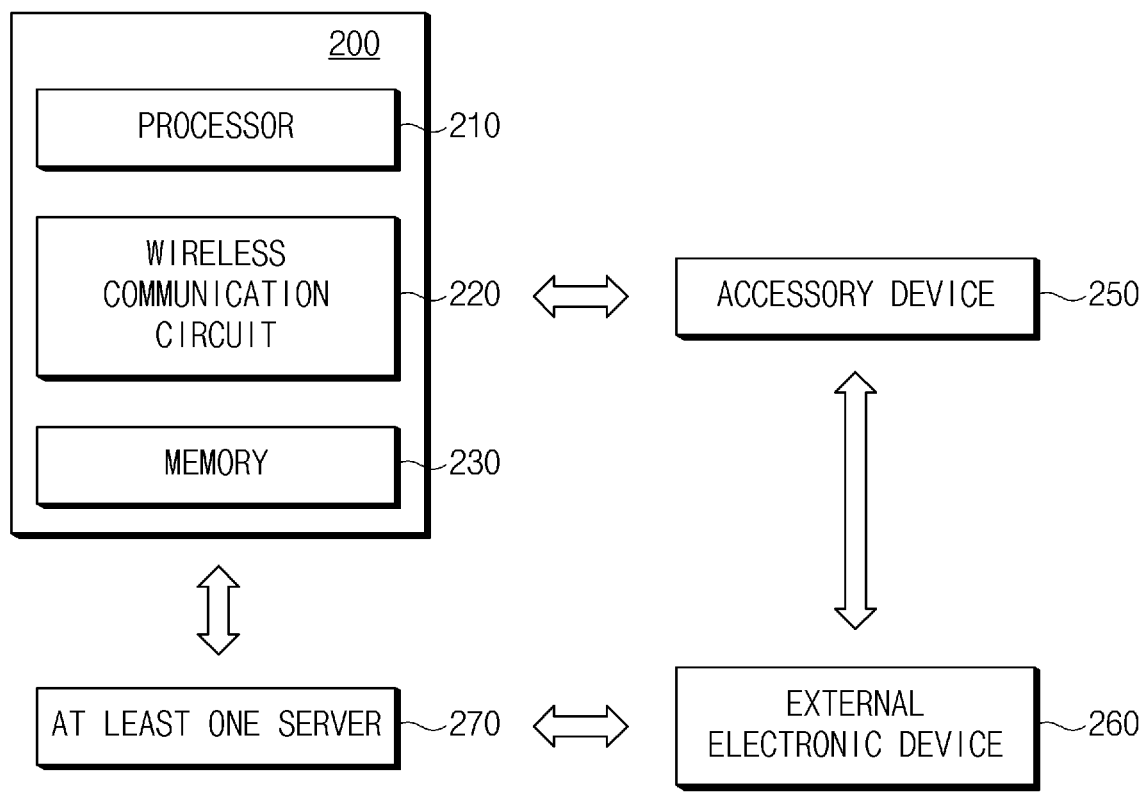
FIG. 2 illustrates a configuration of an electronic device in a network environment, according to an embodiment.

FIG. 2 illustrates a configuration of an electronic device in a network environment, according to an embodiment. Referring to FIG. 2, the electronic device 200 may include or may be similar in many respects to the electronic device 101 described above with reference to FIG. 1, and may include additional features not mentioned above.

According to an embodiment, the electronic device 200 (e.g., an electronic device 101 of FIG. 1) may include a processor 210, a wireless communication circuit 220, and/or a memory 230. The configuration of the electronic device 200 shown in FIG. 2 is illustrative, and, for example, the electronic device 200 may further include additional components, fewer components, or differently arranged components than those shown in FIG. 2. For example, in some embodiments, the electronic device 200 may include a battery (e.g., battery 189 of FIG. 1).

The processor 210 (e.g., a processor 120 of FIG. 1) may execute, for example, software (e.g., a program 140 of FIG. 1) to control at least one other component (e.g., a hardware or software component) of the electronic device 200, which may be connected with the processor 210, and may perform a variety of data processing and calculation.

The wireless communication circuit 220 (e.g., a communication module 190 of FIG. 1) may establish a wireless communication channel between the electronic device 200 and an external electronic device (e.g., an accessory device 250, at least one server 270) and/or may assist in performing communication over the established communication channel. According to an embodiment, the wireless communication circuit 220 may include, for example, a cellular communication module, a short range wireless communication module, a GNSS communication module.

The memory 230 (e.g., a memory 130 of FIG. 1) may store various pieces of data used by the processor 210 of the electronic device 200. The data may include, for example, software (e.g., the program 140 of FIG. 1) and input data or output data for a command associated with it.

According to various embodiments, an external electronic device 260 (e.g., an electronic device 104 of FIG. 1) may establish a device-to-device connection (e.g., Bluetooth low energy (BLE) communication) with the accessory device 250. The external electronic device 260 may onboard the accessory device 250 to at least one server 270. The onboarding operation may refer to an initial setting operation, which may include registering, authenticating, or mapping resources of the accessory device 250. Upon the onboarding, the external electronic device 260 may request a first decryption key (e.g., a friend key) from the accessory device 250. The external electronic device 260 may transmit the first decryption key, received from the accessory device 250, to the at least one server 270. The first decryption key may be a symmetric key.

According to an embodiment, when meeting a specified condition, the electronic device 200 may be registered as a friend device with the at least one server 270. According to an embodiment, when the external electronic device 260 onboards the accessory device 250 and the electronic device 200 and the external electronic device 260 are connected with the same access point (AP), the electronic device 200 may determine that the specified condition is met. Alternatively or additionally, when the external electronic device 260 onboards the accessory device 250 and the electronic device 200 is located in a specified region, the electronic device 200 may determine that the specified condition is met. According to an optional or additional embodiment, when the external electronic device 260 onboards the accessory device 250 and the electronic device 200 is a device authenticated from the external electronic device 260, the electronic device 200 may determine that the specified condition is met. The at least one server 270 may transmit the first decryption key (e.g., the friend key) to the electronic device 200 registered as the friend device. The decryption key may be originated from the accessory device 250. The first decryption key may correspond to a first encryption key.

According to an embodiment, when the device-to-device connection with the external electronic device 260 is released, the accessory device 250 may broadcast an advertising packet to a nearby device (e.g., the electronic device 200). The advertising packet may include device information of the accessory device 250 and rich data. The rich data may further include additional information associated with the accessory device 250. For example, the rich data may include device details, owner information, a pairing history, and/or battery state information of the accessory device 250. The rich data may be encrypted based on the first encryption key by the accessory device 250.

According to an embodiment, the processor 210 may decrypt the rich data using the first decryption key. For example, the first decryption key may be stored in the memory 230 of the electronic device 200.

According to an embodiment, the processor 210 may transmit the device information of the accessory device 250, the decrypted rich data, and the location information of the accessory device 250 to the at least one server 270. For example, the processor 210 may transmit information associated with the electronic device 200 (e.g., type and user information of the electronic device 200) together (e.g., a same message).

According to an embodiment, the processor 210 may provide the location information of the accessory device 250. For example, when the electronic device 200 is a television (TV), the processor 210 may display the location information of the accessory device 250 on a display (e.g., a display module 160 of FIG. 1). According to an optional or additional embodiment, when decrypting the rich data, the processor 210 may further display additional information in conjunction with the accessory device 250. For example, the processor 210 may further display a device name and/or owner information of the accessory device 250. According to another optional or additional embodiment, the processor 210 may determine a location of the accessory device 250 at high accuracy (e.g., within a predetermined error range) using the rich data. For example, the processor 210 may determine a location where a last pairing connection of the accessory device 250 is disconnected based on the pairing history. According to an embodiment, the processor 210 display the owner information of the accessory device 250 together.

According to an embodiment, only the electronic device 200 registered as the friend device may obtain the information included in the rich data, thus protecting personal information of users of the accessory device 250 and the external electronic device 260. For example, the owner information of the accessory device 250, which is included in the rich data, and movement path information in a pairing state may be obtained by only the electronic device 200 having the first decryption key.

According to an embodiment, the external electronic device 260 may receive information associated with the location of the accessory device 250 from the at least one server 270. The external electronic device 260 may provide a user with the location information of the accessory device 250.

According to an embodiment, when the information associated with the location of the accessory device 250 is originated from the friend device (e.g., the electronic device 200), the external electronic device 260 may further receive information associated with the electronic device 200. When providing the user with the location information of the accessory device 250, the external electronic device 260 may further provide the information (e.g., type and user information) associated with the electronic device 200. The external electronic device 260 may provide information associated with a neighbor device (e.g., the electronic device 200) having the first decryption key, thus helping the user to determine the location of the accessory device 250.

According to an embodiment, when the information associated with the location of the accessory device 250 is originated from the friend device (e.g., the electronic device 200), the external electronic device 260 may receive the rich data. The external electronic device 260 may provide the location information of the accessory device 250 at high accuracy based on the rich data. For example, when the rich data includes pairing history information, the external electronic device 260 may provide a movement path of the accessory device 250 in the pairing state.

Figure 3:
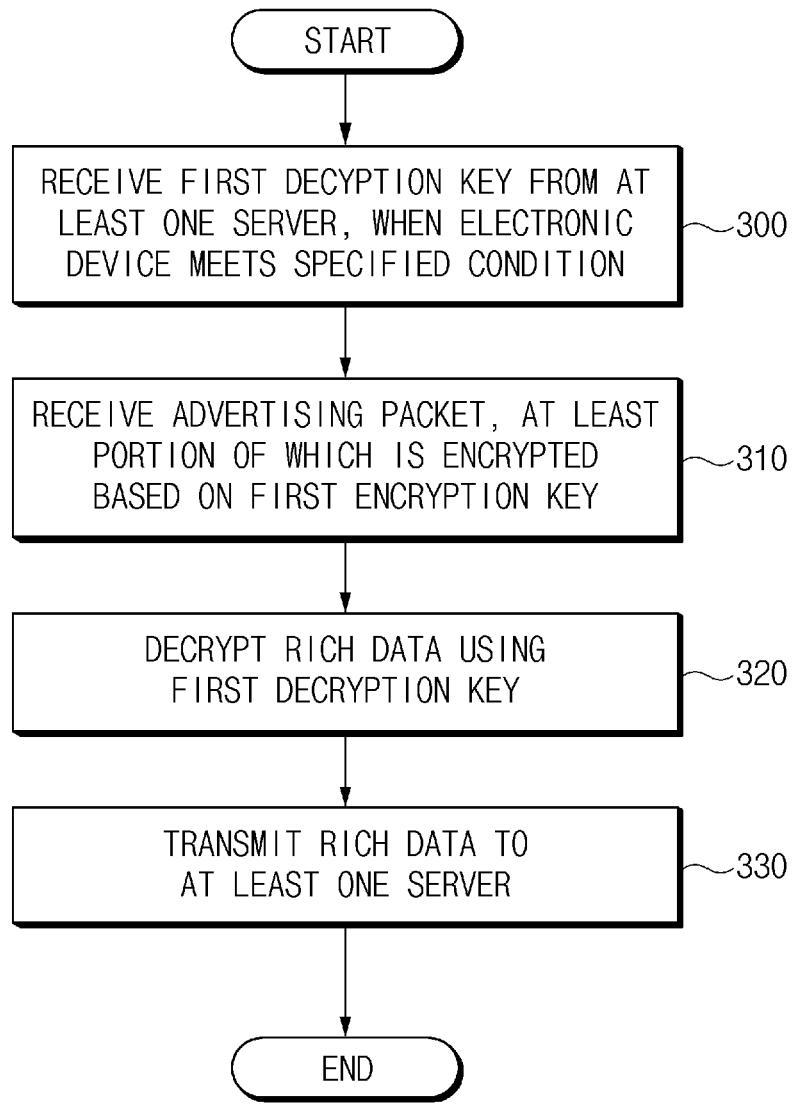
FIG. 3 is a flowchart for describing an operation of an electronic device, according to an embodiment.

FIG. 3 is a flowchart for describing an operation of an electronic device according to an embodiment.

In operation 300, when an electronic device (e.g., the electronic device 200 of FIG. 2, the electronic device 101 of FIG. 1) meets a specified condition, a processor (e.g., a processor 210 of FIG. 2) may receive a first decryption key from at least one server (e.g., at least one server 270 of FIG. 2). That is, the at least one server 270 may register the electronic device 200 as a friend device.

According to an embodiment, the first decryption key may correspond to a first encryption key. For example, the first decryption key and the first encryption key may be symmetric keys. Alternatively or additionally, the first decryption key and the first encryption key may be the same as each other. Hereinafter, the first decryption key may be referred to as a friend key.

In operation 310, the processor 210 may receive an advertising packet, at least a portion of which is encrypted based on the first encryption key, from the accessory device 250.

According to an embodiment, the advertising packet may include device information of the accessory device 250 and rich data. For example, the device information may include an identifier (ID) of the accessory device 250, a manufacturer of the accessory device 250, a model name of the accessory device 250, and/or a device name set by a user. For example, the rich data may include device details, owner information, a pairing history, and/or battery state information of the accessory device 250. Alternatively or additionally, the rich data may include additional detailed information of the accessory device 250 and/or personal information of an owner of the accessory device 250. According to an embodiment, the accessory device 250 may encrypt the rich data using the first encryption key.

In operation 320, the processor 210 may decrypt the rich data using the first decryption key. The first decryption key may be stored in a memory (e.g., a memory 230 of FIG. 2) of the electronic device 200.

In operation 330, the processor 210 may transmit the rich data to the at least one server 270. According to an embodiment, in operation 330, the processor 210 may transmit location information of the accessory device 250, the device information of the accessory device 250, and/or information associated with the electronic device 200 (e.g., type and user information of the electronic device 200) together with the rich data to the at least one server 270.

Figure 4:
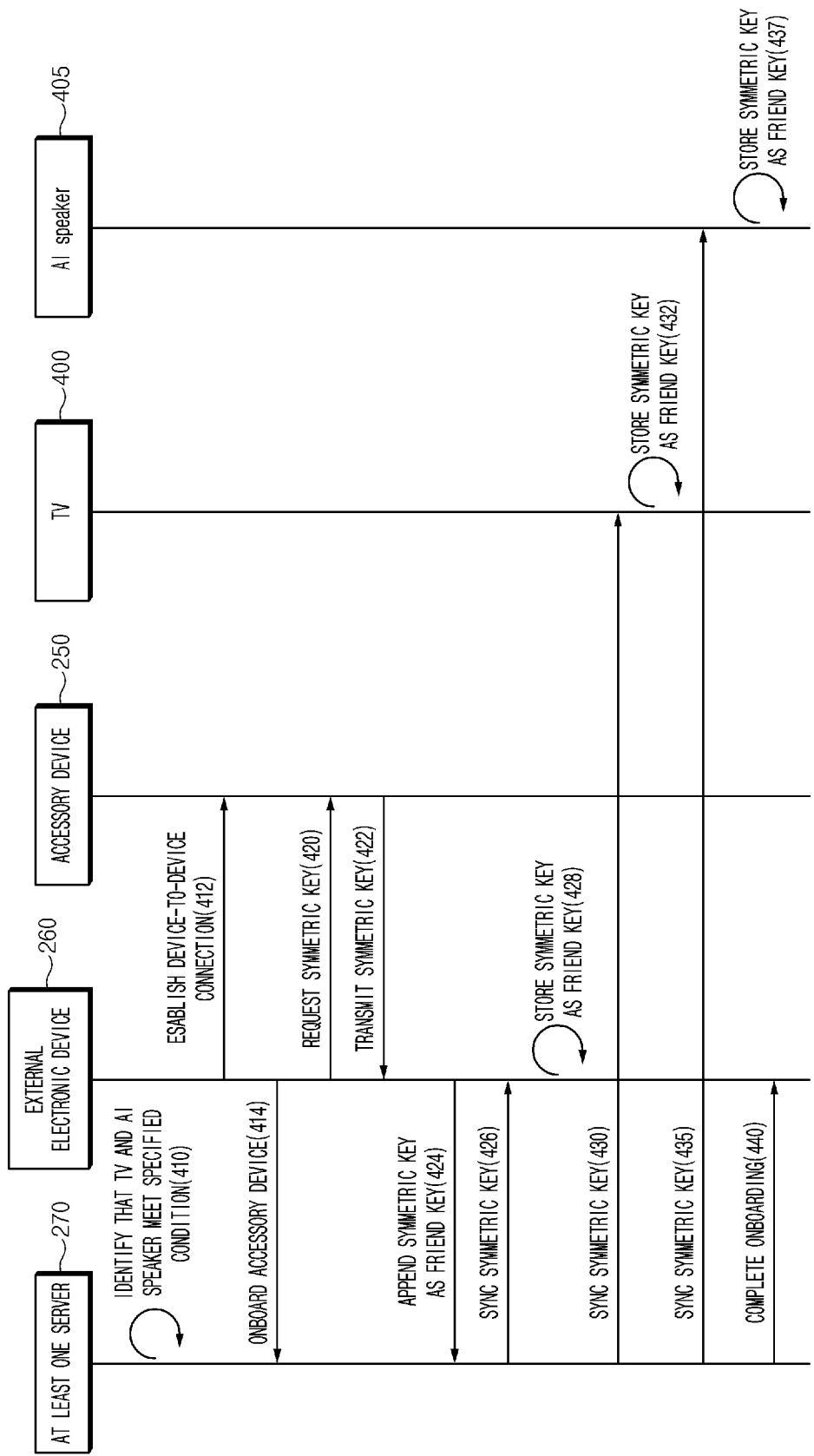
FIG. 4 is a signal sequence diagram for describing a method for sharing a friend key, according to an embodiment.

FIG. 4 is a signal sequence diagram for describing a method for sharing a friend key, according to an embodiment.

A TV 400 and/or an artificial intelligence (AI) speaker 405 of FIG. 4 may be and/or may include an electronic device (e.g., electronic device 200 of FIG. 2, electronic device 101 of FIG. 1). The TV 400 and/or the AI speaker 405 may transmit and/or receive data with an accessory device (e.g., an accessory device 250 of FIG. 2) and/or at least one server (e.g., at least one server 270 of FIG. 2) using a wireless communication circuit (e.g., a wireless communication circuit 220 of FIG. 2).

According to an embodiment, the at least one server 270 may determine that the TV 400 and the AI speaker 405 meet a specified condition (operation 410) as described with reference to FIG. 3. For example, the at least one server 270 may register the TV 400 and the AI speaker 405 as friend devices.

According to various embodiments, an external electronic device (e.g., an external electronic device 260 of FIG. 2) may establish a device-to-device connection with the accessory device 250. The external electronic device 260 may control the accessory device 250 through the device-to-device connection. The external electronic device 260 may onboard the accessory device 250 to the at least one server 270. The onboarding operation may refer to an initial setting operation, which may include registering, authenticating, or mapping resources of the accessory device 250.

As shown in FIG. 4, operation 410 and operation 414 may be sequentially performed. However, operation 410 and operation 414 may be performed at the same time and/or may be performed in a changed order. For example, after the external electronic device 260 onboards the accessory device 250 to the at least one server 270 (operation 414), the at least one server 270 may determine that the TV 400 and the AI speaker 405 meet the specified condition (operation 410).

According to an embodiment, the external electronic device 260 may request a symmetric key from the accessory device 250. The symmetric key may be and/or may include a first decryption key. For example, a first encryption key may be the same as the first decryption key. The accessory device 250 may transmit the symmetric key to the external electronic device 260 (operation 422).

According to an embodiment, the external electronic device 260 may append the symmetric key as a friend key to the at least one server 270. The symmetric key may be stored in a secure area of a memory of the at least one server 270. The at least one server 270 may synchronize the symmetric key with the external electronic device 260 (operation 426). The external electronic device 260 may store the symmetric key as a friend key (operation 428).

According to an embodiment, the at least one server 270 may synchronize the symmetric key with the TV 400 and the AI speaker 405 meeting the specified condition (operations 430 and 435). The TV 400 may store the symmetric key as the friend key (operation 432). The friend key may be stored in a memory (e.g., a memory 230 of FIG. 2) of the TV 400. The AI speaker 405 may store the symmetric key as the friend key (operation 437). The friend key may be stored in a memory (e.g., the memory 230 of FIG. 2) of the AI speaker 405.

The at least one server 270 may end the onboarding and may notify the external electronic device 260 that the onboarding has been completed (operation 440).

Figure 5:
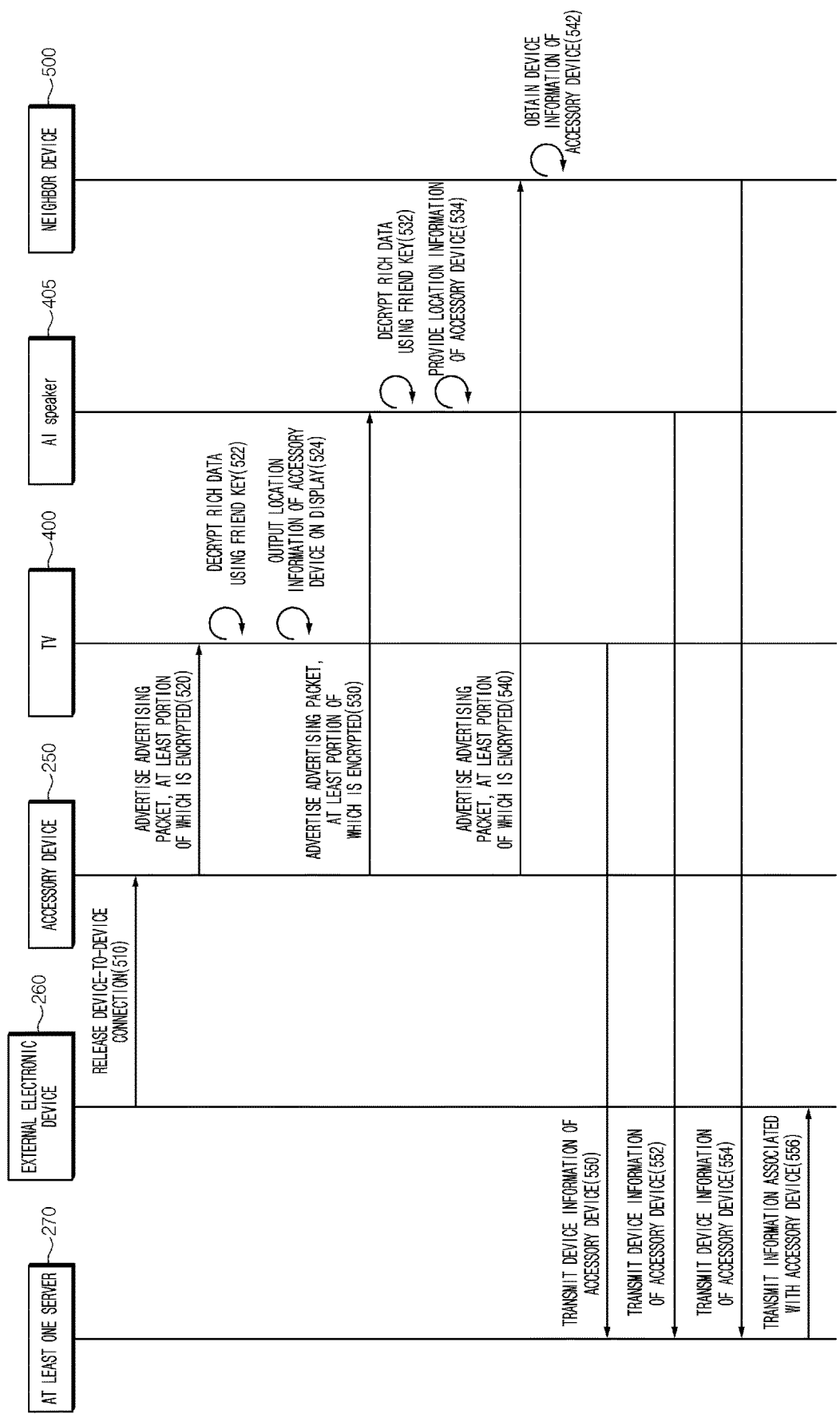
FIG. 5 is a signal sequence diagram for describing an operation of an electronic device in a network environment, according to an embodiment.

FIG. 5 is a signal sequence diagram for describing an operation of an electronic device in a network environment, according to an embodiment.

A TV 400, an AI speaker 405, or a neighbor device 500 of FIG. 5 may be and/or may include an electronic device (e.g., electronic device 200 of FIG. 2, electronic device 101 of FIG. 1). A friend key may be stored in memories (e.g., a memory 230 of FIG. 2) of the TV 400 and/or the AI speaker 405. The neighbor device 500 may be and/or may include a device which does not have the friend key.

According to an embodiment, a device-to-device connection between an external electronic device 260 and an accessory device 250 may be released (operation 510). For example, when the accessory device 250 is away from the external electronic device 260 over a certain distance (e.g., a predetermined distance), the device-to-device connection may be released. In an embodiment, the certain distance may be defined by a BLE communication protocol and/or another design constraint. In an optional or additional embodiment, when the device-to-device connection is released, the external electronic device 260 may report that the accessory device 250 is lost to the at least one server 270. That is, the at least one server 270 may determine the accessory device 250 as being in a lost state.

According to an embodiment, the accessory device 250 may advertise an advertising packet, at least a portion of which may be encrypted, to the TV 400 (operation 520). The advertising packet may include device information of the accessory device 250 and/or rich data. According to an embodiment, the rich data may be encrypted based on a symmetric key (e.g., a first encryption key) by the accessory device 250.

According to an embodiment, the TV 400 may decrypt the rich data using a friend key (e.g., a first decryption key) (operation 522). According to an embodiment, the TV 400 may output location information of the accessory device 250 on a display (e.g., a display module 160 of FIG. 1). The TV 400 may obtain the location information of the accessory device 250 based on ultra-wideband (UWB) information. According to an optional or additional embodiment, the TV 400 may obtain accurate (e.g., within a predetermined error range) location information of the accessory device 250 based on the rich data. For example, the TV 400 may determine a location of the accessory device 250 based on a location where the pairing of the accessory device 250 is disconnected.

According to an embodiment, the accessory device 250 may advertise an advertising packet, at least a portion (e.g., the rich data) of which may be encrypted, to the AI speaker 405 (operation 530). According to an embodiment, the AI speaker 405 may decrypt the rich data using the friend key (e.g., the first decryption key) (operation 532). The AI speaker 405 may provide the location information of the accessory device 250 through a sound output device (e.g., a sound output module 155 of FIG. 1) (operation 534). According to an embodiment, the AI speaker 405 may provide that the accessory device 250 is located nearby as voice information through a voice output device. A user may guess a location of the accessory device 250 based on the voice information output from the AI speaker 405.

According to an embodiment, the accessory device 250 may advertise the advertising packet, the at least a portion (e.g., the rich data) of which may be encrypted, to the neighbor device 500 (operation 540). Because the neighbor device 500 does not have the friend key, the neighbor device 500 may not be able to decrypt the rich data. Thus, the neighbor device 500 may obtain only device information of the accessory device 250 (operation 542).

According to an embodiment, the TV 400, the AI speaker 405, and the neighbor device 500 may transmit the location information of the accessory device 250 to the at least one server 270 (operations 550, 552, and 554). According to an embodiment, the location information of the accessory device 250 may be based on a location of the TV 400, the AI speaker 405, and/or the neighbor device 500, respectively. According to an optional or additional embodiment, the TV 400 and the AI speaker 405 may transmit the obtained rich data, the device information of the accessory device 250, and/or the information (e.g., a type and a user) associated with the TV 400 and the AI speaker 405 together with the location information of the accessory device 250. According to an embodiment, the neighbor device 500 may transmit the device information of the accessory device 250 together with the location information of the accessory device 250. The at least one server 270 may receive differential information from the TV 400, the AI speaker 405, and the neighbor device 500 depending on whether the sending electronic device (e.g., the TV 400, the AI speaker 405, and the neighbor device 500) has a friend key. For example, the TV 400 and/or the AI speaker 405 may have the friend key, and as a result, the TV 400 and/or the AI speaker 405 may send the differential information to the at least one server 270. Alternatively or additionally, the neighbor device 500 may not have the friend key, and as a result, the neighbor device 500 may not send the differential information to the at least one server 270.

According to an embodiment, the at least one server 270 may transmit the information associated with the accessory device 250 to the external electronic device 260. The external electronic device 260 may determine the location information of the accessory device 250 based on the received information (operation 556).

Figure 6:
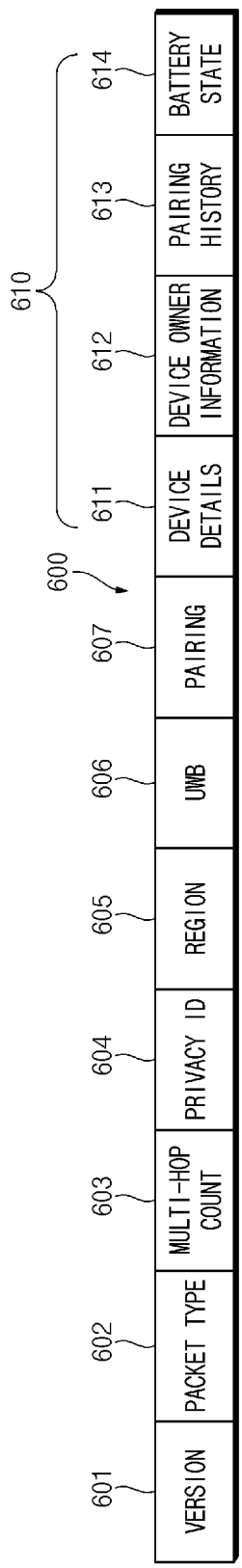
FIG. 6 illustrates a structure of an advertising packet, according to an embodiment.

FIG. 6 illustrates a structure of an advertising packet, according to an embodiment.

An accessory device (e.g., an accessory device 250 of FIG. 2) may generate an advertising packet 600 (e.g., rich data of FIG. 5) including device information of the accessory device 250. The advertising packet 600 may further include the rich data. The accessory device 250 may encrypt the rich data based on a symmetric key (e.g., a first encryption key). The rich data may be decrypted by a neighbor device (e.g., an electronic device 200 of FIG. 2) having a symmetric key (e.g., a first decryption key).

According to an embodiment, the accessory device 250 may broadcast an advertising packet 600 based on a specified communication protocol (e.g., BLE) using a communication circuit (e.g., a communication module 190 of FIG. 1). Operations performed by the accessory device 250 may be understood as being performed by a processor (e.g., a processor 120 of FIG. 1) of the accessory device 250.

According to an embodiment, the advertising packet 600 may include one or more fields for version 601, packet type 602, multi-hop count 603, privacy ID 604, region 605, UWB 606, and/or pairing 607. The advertising packet 600 may further include encrypted packet data 610.

According to an embodiment, the version 601 may refer to a version of the advertising packet 600. Because the advertising packet 600 may be based on a rule shared between the accessory device 250 which broadcasts the advertising packet 600 and an electronic device (e.g., an electronic device 200 of FIG. 2) which receives and analyzes the advertising packet 600, the version of the advertising packet 600 may be used to determine a rule where the electronic device 200 which receives the advertising packet 600 analyzes data included in the advertising packet 600. For example, when receiving the advertising packet 600 with an old version rather than a latest version, the electronic device 200 may analyze the advertising packet 600 depending on a rule corresponding to the old version. For another example, when a version of the electronic device 200 is lower than a version of the advertising packet 600, the electronic device 200 may update the version by means of at least one server (e.g., at least one server 270 of FIG. 2).

According to an embodiment, the packet type 602 may indicate whether the packet type 602 is a packet supporting multi-hop for the advertising packet 600. Alternatively or additionally, the packet type 602 may indicate information about whether the accessory device 250 is currently in an offline mode (e.g., offline finding) and/or an online mode.

According to an embodiment, the multi-hop count 603 may indicate how many times the advertising packet 600 may have been propagated. For example, when the advertising packet 600 has been directly broadcast from the accessory device 250, a multi-hop count of the advertising packet 600 may be defined as zero (0). Alternatively or additionally, when another device which receives the advertising packet 600 from the accessory device 250 and broadcasts the advertising packet 600 again, a multi-hop count of the advertising packet 600 which has been broadcast again may be defined as a number of one (1) or more.

According to an embodiment, the privacy ID 604 may refer to unique identification information of the accessory device 250. Alternatively or additionally, the privacy ID 604 may be and/or may include a random ID generated according to a certain algorithm based on the unique identification information of the accessory device 250.

According to an embodiment, the region 605 may by and/or may include country information of the accessory device 250. For example, the region 605 may include country information received from the at least one server 270 at a time point when the accessory device 250 may have been onboarded and/or information indicating an address of the at least one server 270.

According to an embodiment, the UWB 606 may indicate whether the accessory device 250 is a device supporting UWB communication.

According to an embodiment, the pairing 607 may include information about whether the accessory device 250 is a stand-alone device, a device that operates as a pair (e.g., a wireless earphone composed of two or more units), or a device that is in a state where the two or more units are paired with each other when the accessory device 250 is the device operating as a pair.

According to an embodiment, the encrypted packet data 610 (e.g., rich data) may include fields for device details 611, device owner information 612, pairing history information 613, and/or battery state information 614.

According to an embodiment, the device details 611 may include a device name of the accessory device 250 and/or a device catalog image. In an optional or additional embodiment, the device name may be set by an owner of the accessory device 250.

According to an embodiment, the device owner information 612 may include an owner nickname of the accessory device 250 and/or a contact (e.g., a phone number or an e-mail address). For example, the owner nickname may be set by the owner. The contact (e.g., the phone number) may be, for example, a unique number assigned based on a subscriber identification number (e.g., IMSI) of the external electronic device 260 and/or a number registered by the user.

According to an embodiment, the pairing history information 613 may include a last pairing time of the accessory device 250, a location where it is last recorded in a pairing state, a movement path in the pairing state, and/or location information where pairing is disconnected. The pairing history information 613 may include pairing history information between the accessory device 250 and the external electronic device 260 and/or pairing history information between the accessory device 250 and a neighbor device (e.g., an electronic device 200).

According to an embodiment, the battery state information 614 may include current battery state information and/or battery usage information according to a movement record of the accessory device 250.

Figure 7A:
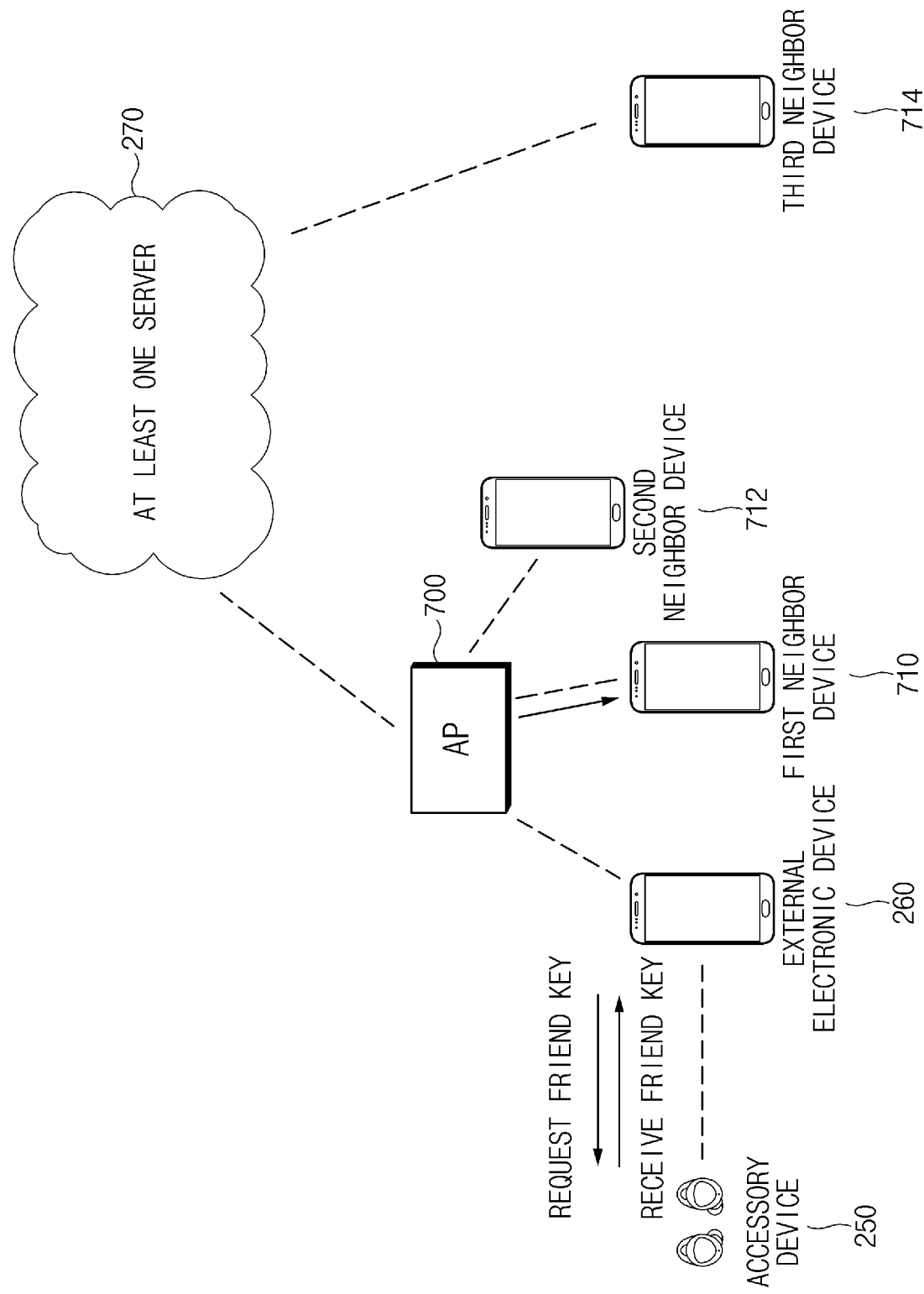
FIG. 7A illustrates an electronic device meeting a specified condition, according to an embodiment.

FIG. 7A illustrates an electronic device meeting a specified condition, according to an embodiment.

According to various embodiments, an external electronic device (e.g., an external electronic device 260 of FIG. 2) may establish a device-to-device connection with an accessory device (e.g., an accessory device 250 of FIG. 2). The external electronic device 260 may be connected with an access point (AP) 700 to use a network (e.g., a second network 199 of FIG. 1). The external electronic device 260 may onboard the accessory device 250 to at least server 270.

According to an embodiment, when the external electronic device 260 onboards the accessory device 250, a first neighbor device 710 (e.g., an electronic device 200 of FIG. 2) and a second neighbor device 712 (e.g., the electronic device 200 of FIG. 2) may be connected with the same AP 700 as the external electronic device 260. In this case, the at least one server 270 may determine that the first neighbor device 710 and the second neighbor device 712 meet a specified condition of FIG. 3. The external electronic device 260 may register the first neighbor device 710 and the second neighbor device 712 as friend devices with the at least one server 270.

According to an embodiment, when the external electronic device 260 onboards the accessory device 250, a third neighbor device 714 (e.g., the electronic device 200 of FIG. 2) may be understood as an electronic device which is not connected with the same AP 700 as the external electronic device 260. In such an embodiment, the at least one server 270 may determine that the third neighbor device 714 does not meet the specified condition of FIG. 3.

Figure 7B:
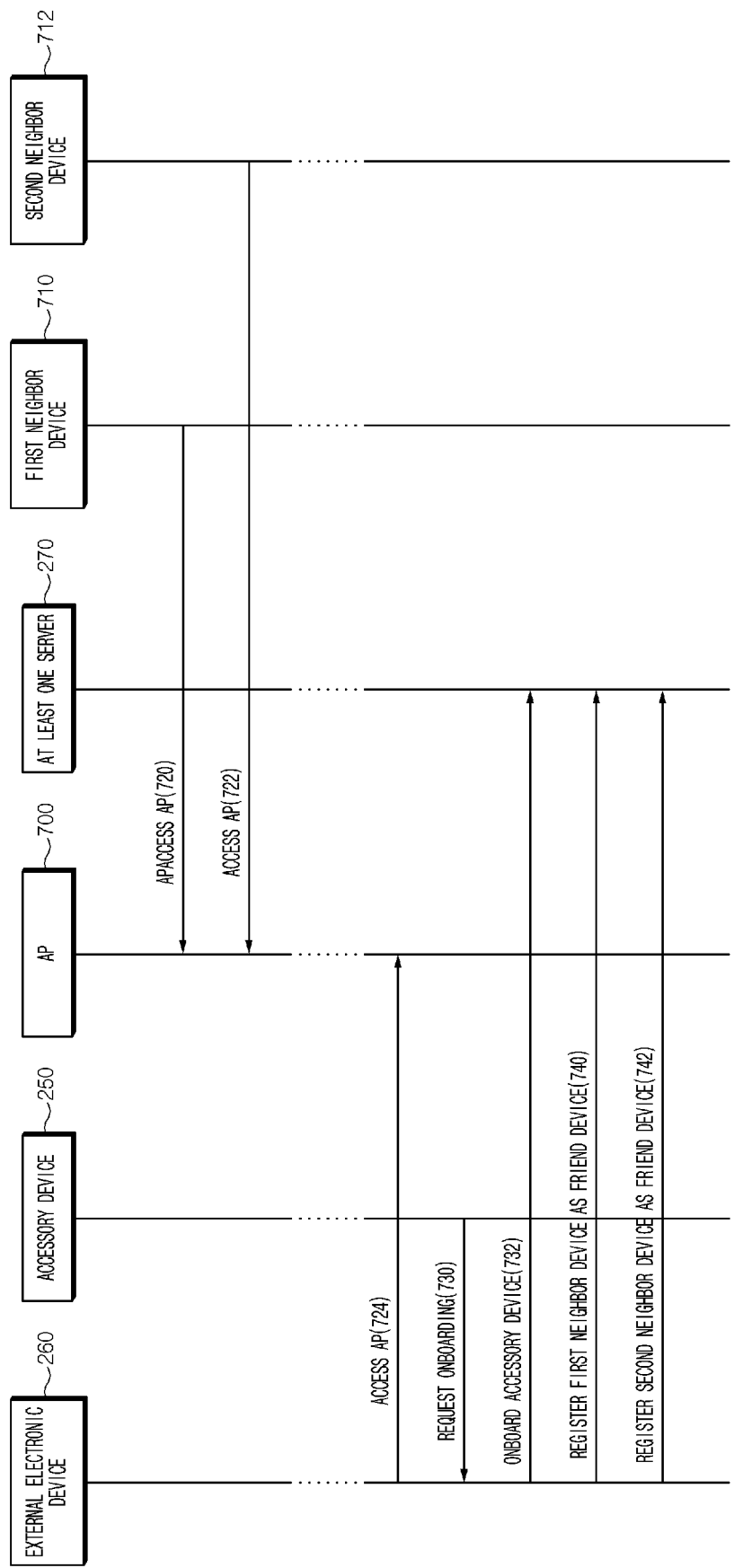
FIG. 7B is a signal sequence diagram for describing an electronic device meeting a specified condition, according to an embodiment.

FIG. 7B is a signal sequence diagram for describing an electronic device meeting a specified condition, according to an embodiment.

According to an embodiment, an external electronic device 260, a first neighbor device 710, and a second neighbor device 712 may be connected with the same AP 700 (operations 720, 722, and 724).

According to an embodiment, an accessory device 250 may transmit an onboarding request signal to the external electronic device 260. The external electronic device 260 may onboard the accessory device 250 to at least one server 270 (operation 732). When onboarding the accessory device 250, the external electronic device 260 may register the first neighbor device 710 and the second neighbor device 712 connected with the same AP 700 as the external electronic device 260 as friend devices with the at least one server 270. In such an embodiment, it may be understood that the first neighbor device 710 and the second neighbor device 712 meet a specified condition as described with reference to FIG. 3.

Figure 8:
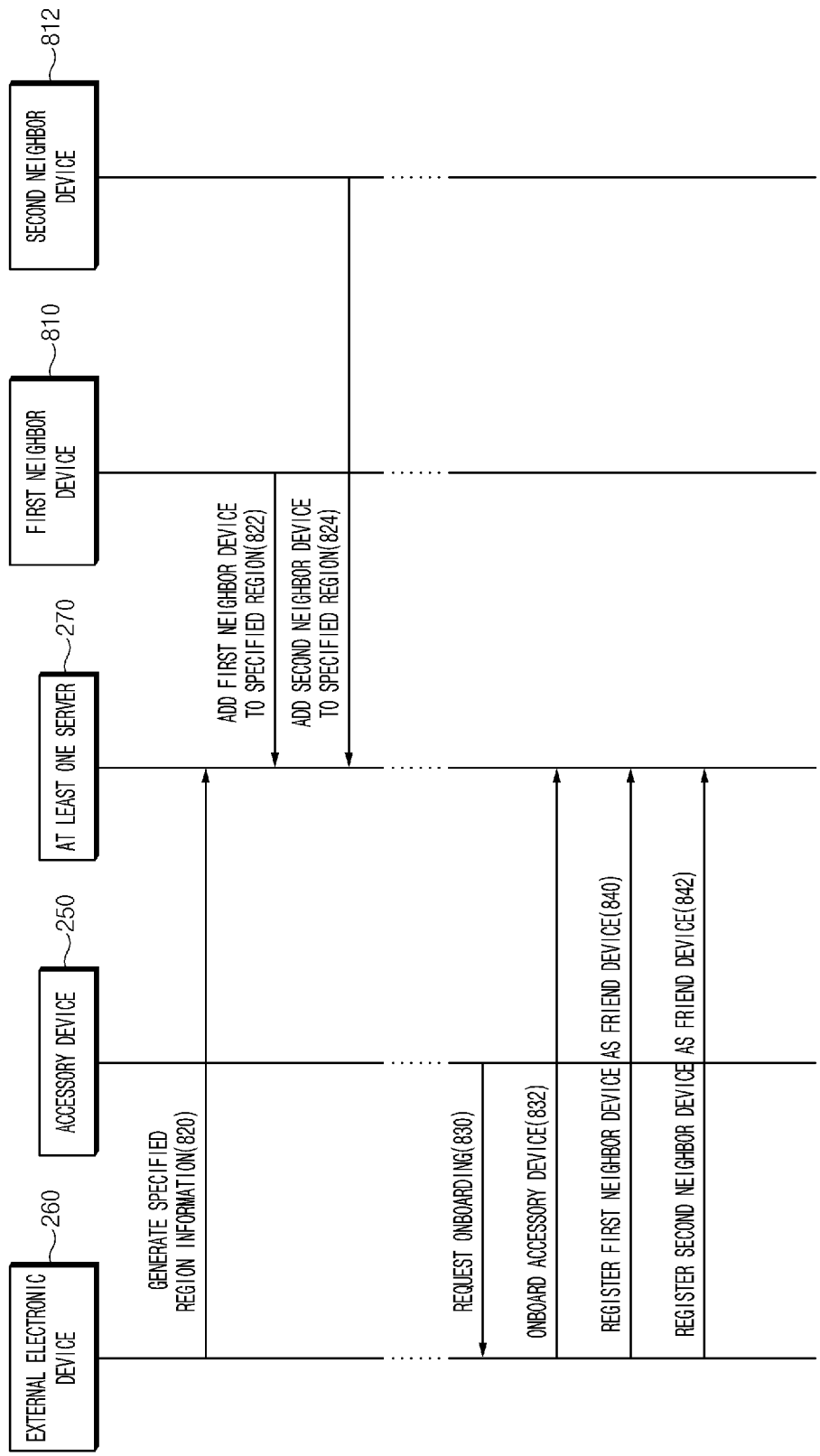
FIG. 8 is a signal sequence diagram for describing an electronic device meeting a specified condition, according to an embodiment.

FIG. 8 is a signal sequence diagram for describing an electronic device meeting a specified condition, according to an embodiment.

According to various embodiments, an external electronic device (e.g., an external electronic device 260 of FIG. 2) may generate specified region information. A specified region may be specified by a user. The specified region may be, for example, a region within a certain radius with respect to one point specified by the user. For another example, the specified region may be a region within a certain radius with respect to a current location of the external electronic device 260. According to an embodiment, the user may specify a frequently visited place as the specified region.

According to an embodiment, when a first neighbor device 810 (e.g., an electronic device 200 of FIG. 2) is located in the specified region, the first neighbor device 810 may request at least one server 270 to add the first neighbor device 810 to the corresponding region (operation 822). According to an embodiment, when a second neighbor device 812 (e.g., the electronic device 200 of FIG. 2) is located in the specified region, the second neighbor device 812 may request the at least one server 270 to add the second neighbor device 812 to the corresponding region (operation 824).

According to an embodiment, an accessory device 250 may request onboarding from the external electronic device 260. For example, the external electronic device 260 may onboard the accessory device 250 to the at least one server 270.

According to an embodiment, when onboarding the accessory device 250, the external electronic device 260 may register neighbor devices (e.g., the first neighbor device 810 and the second neighbor device 812) located in the specified region as friend devices (operations 840 and 842). In such an embodiment, the first neighbor device 810 and the second neighbor device 812 may meet a specified condition as described with reference to FIG. 3.

Figure 9A:
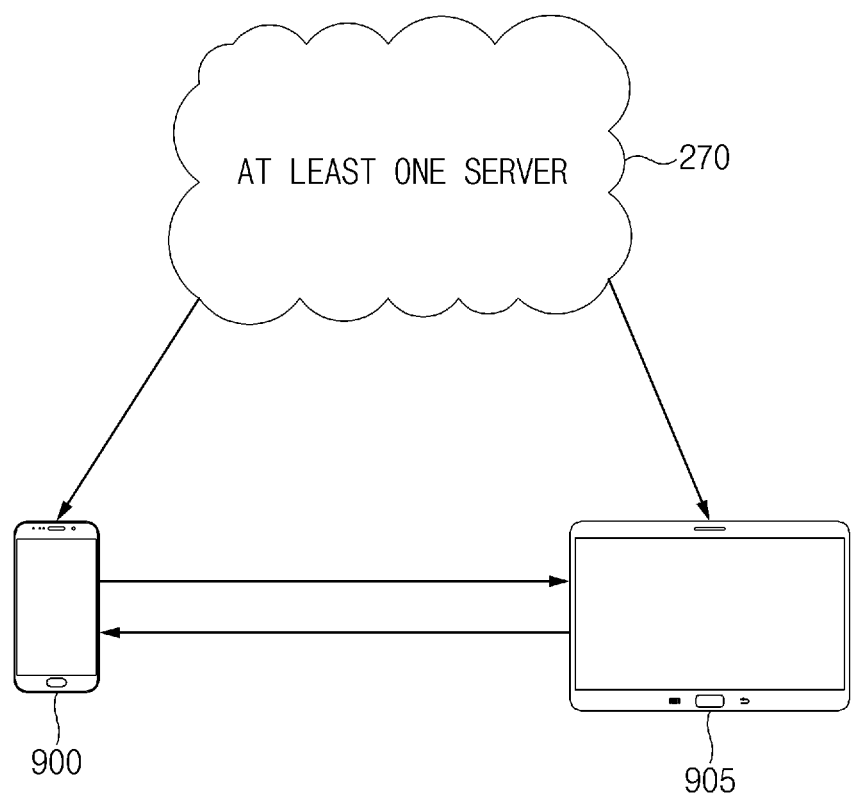
FIG. 9A illustrates authentication of an electronic device, according to an embodiment.

FIG. 9A illustrates authentication of an electronic device, according to an embodiment.

According to an embodiment, a first electronic device 900 (e.g., an electronic device 101 of FIG. 1) may be allocated a unique number (e.g., a phone number) according to first user identification information. The first electronic device 900 may generate first certificate data as unique information capable of identifying the first electronic device 900. The first electronic device 900 may store a first user identification information list including second user identification information. When logging in to at least one server (e.g., at least one server 270 of FIG. 2) based on a first user identification number, the first electronic device 900 may transmit the first user identification information, the first certificate data, and the first user identification information list to the at least one server 270.

According to an embodiment, a second electronic device 905 may be allocated a unique number (e.g., a phone number) according to the second user identification information. The second electronic device 905 may generate second certificate data as unique information capable of identifying the second electronic device 905. The second electronic device 905 may store a second user identification information list including the first user identification information. When logging in to the at least one server 270, the second electronic device 905 may transmit the second user identification information, the second certificate data, and/or the second user identification information list to the at least one server 270.

The at least one server 270 may compare the first user identification information with the second user identification information list and may compare the second user identification information with the first user identification information list. The at least one server 270 may provide the first electronic device 900 with a first certificate list generated based on the compared results and may provide the second electronic device 905 with a second certificate list. The first certificate list may include the second certificate data, and the second certificate list may include the first certificate data.

According to an embodiment, the first certificate list obtained by the first electronic device 900 may include user identification information of the second electronic device 905 and the second certificate data. Alternatively or additionally, the second certificate list obtained by the second electronic device 905 may include user identification information of the first electronic device 900 and the first certificate data.

According to an embodiment, the first electronic device 900 may transmit the first certificate data to a nearby electronic device (e.g., the second electronic device 905). In such an embodiment, the first certificate data may be and/or may include hash data that may be at least partially encrypted. The second electronic device 905 may receive the first certificate data and may search the second certificate list for the first certificate data. When identifying the first certificate data of the first electronic device 900 from the second certificate list, the second electronic device 905 may transmit the second certificate data to the first electronic device 900.

When identifying the second certificate data of the second electronic device 905 from the first certificate list, the first electronic device 900 may authenticate the second electronic device 905 based on a first certificate and a second certificate.

When mutual authentication between the first electronic device 900 and the second electronic device 905 is completed, the first electronic device 900 and the second electronic device 905 may share a session key. The first electronic device 900 and the second electronic device 905 may establish an encrypted device-to-device connection based on the session key. In an embodiment, the session key may be a temporary key, which may be valid only during one communication session.

Figure 9B:
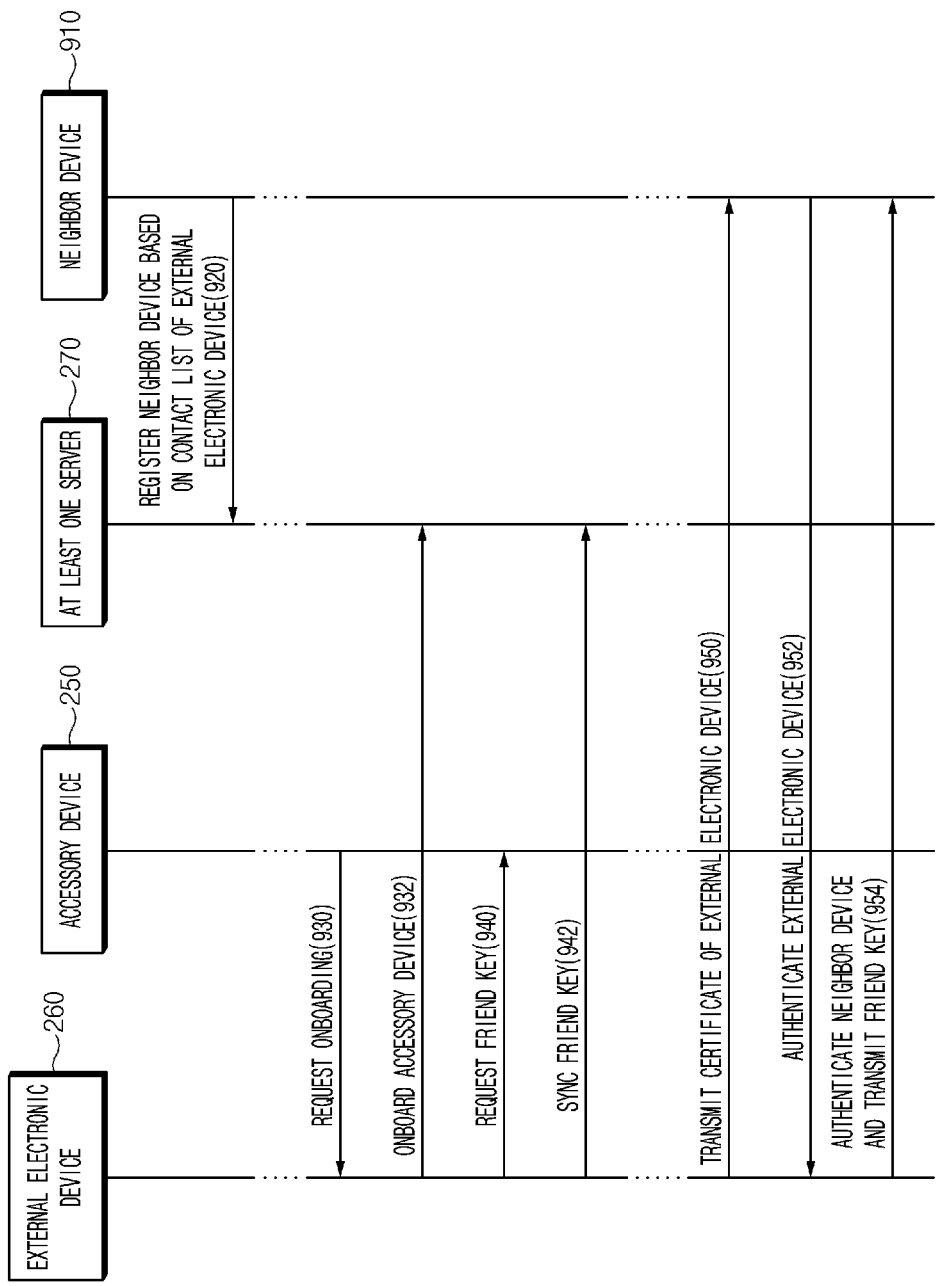
FIG. 9B is a signal sequence diagram for describing an electronic device meeting a specified condition, according to an embodiment.

FIG. 9B is a signal sequence diagram for describing an electronic device meeting a specified condition, according to an embodiment.

According to an embodiment, a neighbor device 910 (e.g., a second electronic device 905 of FIG. 9A) may be registered with at least one server 270 based on a contact list (e.g., a first user identification list of FIG. 9A) of an external electronic device 260 (e.g., a first electronic device 900 of FIG. 9A). For example, the external electronic device 260 may transmit the contact list to the at least one server 270, and the neighbor device 910 may transmit user identification information of the neighbor device 910 to the at least one server 270. When determining that the user identification information of the neighbor device 910 is included in the contact list of the external electronic device 260, the at least one server 270 may transmit certificate data of the neighbor device 910 to the external electronic device 260.

According to an embodiment, an accessory device 250 may transmit an onboarding request signal to the external electronic device 260 (operation 930). The external electronic device 260 may onboard the accessory device 250 to the at least one server 270 (operation 932). The external electronic device 260 may request a friend key from the accessory device 250 (operation 940). The external electronic device 260 may sync the received friend key with the at least one server 270 (operation 942).

According to an embodiment, the external electronic device 260 may transmit a certificate of the external electronic device 260 to the neighbor device 910 located nearby (e.g., within a certain radius) (operation 950). The neighbor device 910 may authenticate the external electronic device 260 based on the certificate of the external electronic device 260 (operation 952). The neighbor device 910 may transmit a certificate of the neighbor device 910 to the external electronic device 260.

According to an embodiment, the external electronic device 260 may authenticate the neighbor device 910 based on the certificate of the neighbor device 910 and may transmit a friend key to the neighbor device 910 (operation 954). According to an embodiment, when the external electronic device 260 and the neighbor device 910 perform mutual authentication, the at least one server 270 may transmit the friend key to the neighbor device 910.

In an embodiment, the mutual authentication between the external electronic device 260 and the neighbor device 910 may be effected as described with reference to FIG. 9A.

Figure 10:
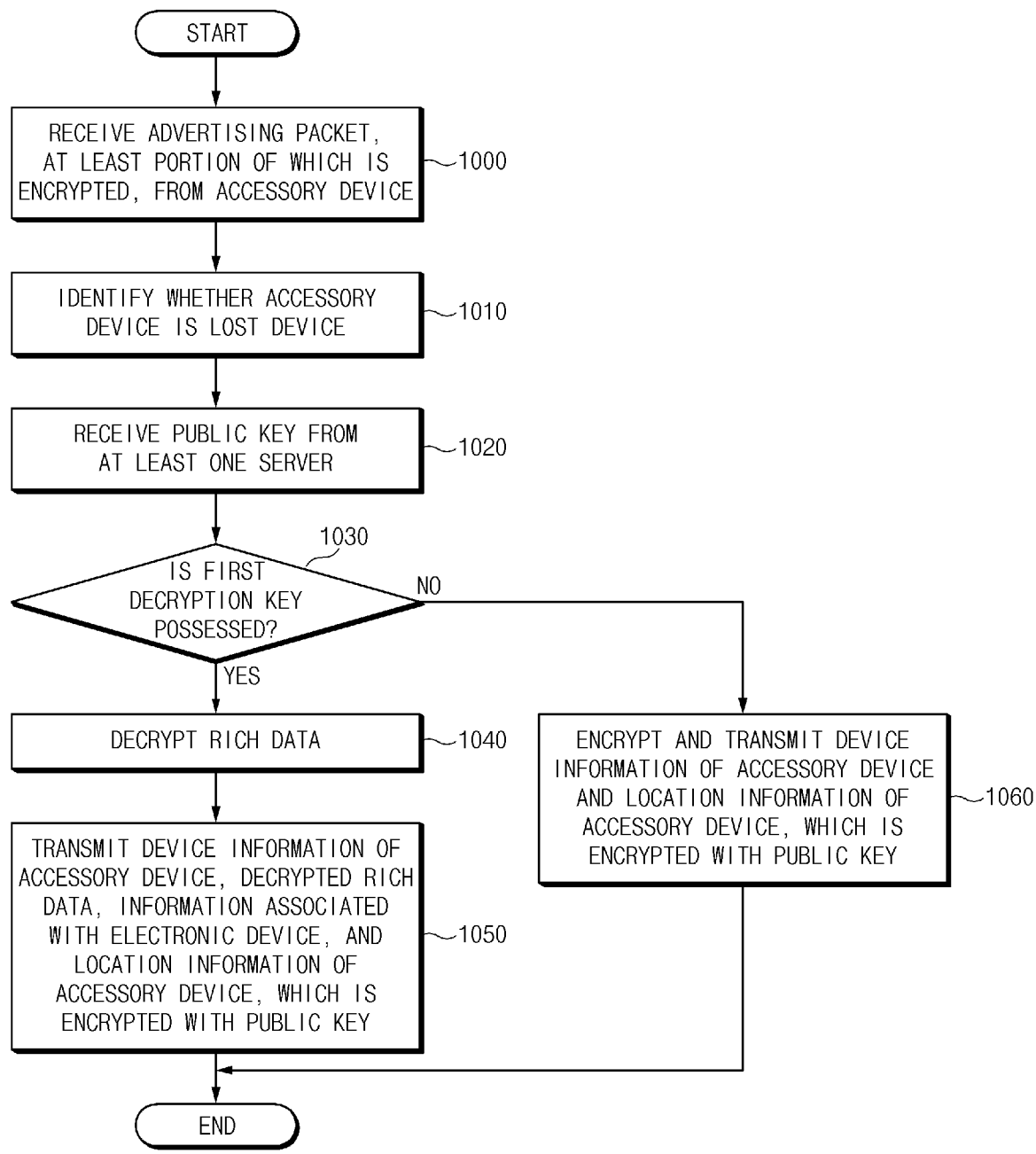
FIG. 10 is a flowchart for describing an operation of an electronic device, according to an embodiment.

FIG. 10 is a flowchart for describing an operation of an electronic device, according to an embodiment.

In operation 1000, a processor (e.g., a processor 210 of FIG. 2) of an electronic device (e.g., an electronic device 200 of FIG. 2) may receive an advertising packet, at least a portion of which may be encrypted, from an accessory device (e.g., an accessory device 250 of FIG. 2). The advertising packet may include device information of the accessory device 250 and/or rich data. The rich data may be encrypted based on a first encryption key by the accessory device 250. The rich data included in the advertising packet may be similar to and/or the same as the rich data described with reference to FIG. 6.

In operation 1010, the processor 210 may determine whether the accessory device 250 is a lost device. According to various embodiments, when a device-to-device connection between an external electronic device (e.g., an external electronic device 260 of FIG. 2) and the accessory device 250 is released, the external electronic device 260 may report that the accessory device 250 is in a lost state to at least one server (e.g., at least one server 270 of FIG. 2). That is, the at least one server 270 may determine the accessory device 250 as being in the lost state. The processor 210 may determine that the accessory device 250 is in the lost state by means of the at least one server 270.

In operation 1020, the processor 210 may receive a public key from the at least one server 270. According to an embodiment, when the accessory device 250 is determined to be in the lost state in operation 1010, the processor 210 may request the public key from the at least one server 270. The at least one server 270 may transmit the public key to the electronic device 200 based on state information (e.g., the lost state) of the accessory device 250.

In operation 1030, the processor 210 may determine whether the electronic device 200 has a first decryption key (e.g., a friend key). When the electronic device 200 meets a specified condition (e.g., as described with reference to FIG. 3), the processor 210 may receive the first decryption key from the at least one server 270 before operation 1000. For example, the first decryption key may be stored in a memory (e.g., a memory 230 of FIG. 2) of the electronic device 200. According to an embodiment, the first decryption key may correspond to a first encryption key. According to an optional or additional embodiment, the first decryption key and the first encryption key may be symmetric keys.

When the electronic device 200 has the first decryption key (YES in operation 1030), the processor 210 may proceed to operation 1040. In operation 1040, the processor 210 may decrypt the rich data using the first decryption key.

In operation 1050, the processor 210 may transmit the device information of the accessory device 250, the decrypted rich data, information associated with the electronic device 200, and location information of the accessory device 250, which is encrypted with the public key, to the at least one server 270. According to an embodiment, the location information of the accessory device 250 may be based on a location of the electronic device 200. The information associated with the electronic device 200 may include type and/or user information of the electronic device 200.

When the electronic device 200 does not have the first decryption key (NO in operation 1030), the processor 210 may proceed to operation 1060. In operation 1060, the processor 210 may transmit the device information of the accessory device 250 and the location information of the accessory device 250, which may be encrypted with the public key, to the at least one server 270.

Figure 11:
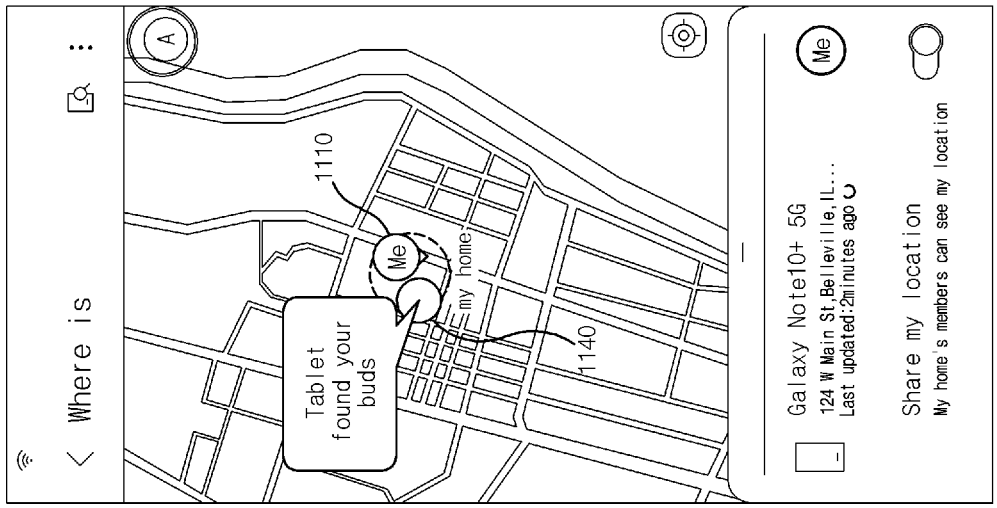
FIG. 11 illustrates a screen of an external electronic device, according to an embodiment.
Figure 11:
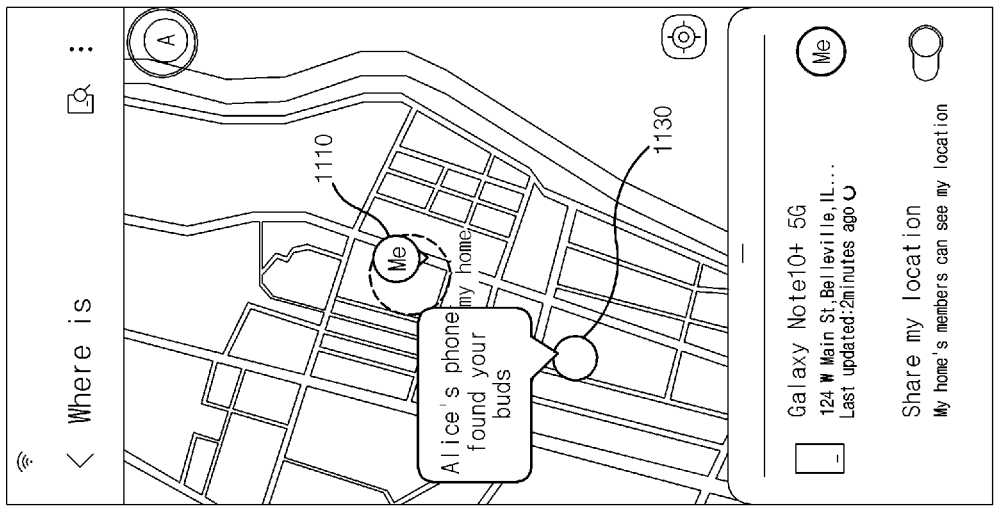
Figure 11:
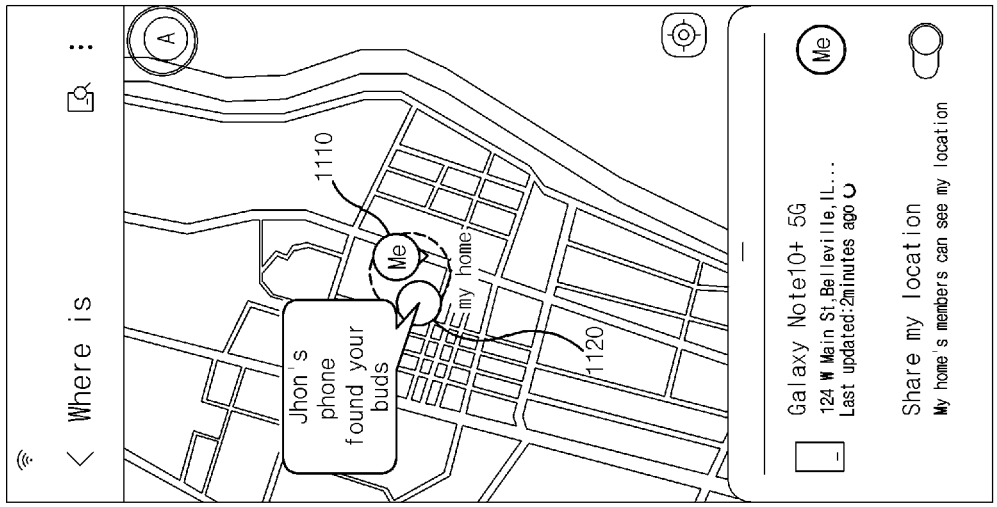

FIG. 11 illustrates a screen of an external electronic device, according to an embodiment.

An external electronic device (e.g., an external electronic device 260 of FIG. 2) may receive information associated with a location of an accessory device (e.g., an accessory device 250 of FIG. 2) from at least one server (e.g., at least one server 270 of FIG. 2). The external electronic device 260 may provide a user with a user interface (UI) for searching for a lost device (e.g., the accessory device 250) based on the received information. When the information received from the at least one server 270 further includes decrypted rich data, the external electronic device 260 may provide the rich data and information about a neighbor device (e.g., an electronic device 200 of FIG. 2) from which the rich data may be originated.

A screen 1100a and a screen 1100b illustrate UIs provided by the external electronic device 260, when the information received by the external electronic device 260 includes the rich data. A screen 1100c illustrates a UI provided by the external electronic device 260, when the information received by the external electronic device 260 includes only device information and location information of the accessory device 250.

Referring to the screen 1100a, the external electronic device 260 may display a first visual object 1110 indicating a location of the external electronic device 260 and a second visual object 1120 indicating a location of the accessory device 250. The external electronic device 260 may provide relative locations of the external electronic device 260 and the accessory device 250 by means of the first visual object 1110 and the second visual object 1120.

According to an embodiment, the external electronic device 260 may display information (e.g., user information (e.g., "Jhon")) of the electronic device 200 together with the visual object 1120 based on the rich data and information associated with the neighbor device from which the rich data is originated. In such an embodiment, it may be understood that the accessory device 250 is located in a region (e.g., "my home") specified by a user of the external electronic device 260.

Referring to the screen 1100b, the external electronic device 260 may display a first visual object 1110 indicating a location of the external electronic device 260 and a third visual object 1130 indicating a location of the accessory device 250. The external electronic device 260 may provide relative locations of the external electronic device 260 and the accessory device 250 by means of the first visual object 1110 and the third visual object 1130.

According to an embodiment, the external electronic device 260 may display information (e.g., user information (e.g., "Alice")) of the electronic device 200 together with the visual object 1130 based on the rich data and information associated with the neighbor device from which the rich data is originated. In such an embodiment, it may be understood that the accessory device 250 may not be located in the region (e.g., "my home") specified by the user of the external electronic device 260.

Referring to the screen 1100c, the external electronic device 260 may display a visual object 1110 indicating a location of the external electronic device 260 and a visual object 1140 indicating a location of the accessory device 250.

According to an embodiment, the neighbor device on the screen 1100c may not be a friend device. In this case, the external electronic device 260 may fail to receive the rich data from the at least one server 270. The external electronic device 260 may display only limited information (e.g., type information (e.g., "Tablet")) together with the visual object 1140 in conjunction with the neighbor device.

Information displayed on the screen 1100c by the external electronic device 260 may be less in quantity than information displayed on the screen 1100a and the screen 1100c by the external electronic device 260. Alternatively or additionally, location information of the accessory device 250, which may be provided on the screen 1100a and the screen 1100c by the external electronic device 260, may be more accurate than location information of the accessory device 250, which may be provided on the screen 1100c by the external electronic device 260.

As shown in FIG. 11, when a neighbor device (e.g., an electronic device 200 of FIG. 2) is a device registered as a friend device, the external electronic device 260 may display user information of the neighbor device. Based on a UI provided by the external electronic device 260, a user of the external electronic device 260 may identify a user of the neighbor device which receives an advertising packet of the accessory device 250. In such an embodiment, the external electronic device 260 may provide the neighbor device with a notification associated with the loss of the accessory device 250, using contact information of the neighbor device. Alternatively or additionally, the user of the external electronic device 260 may directly contact the user of the neighbor device to ascertain a location of the accessory device 250.

Figure 12:
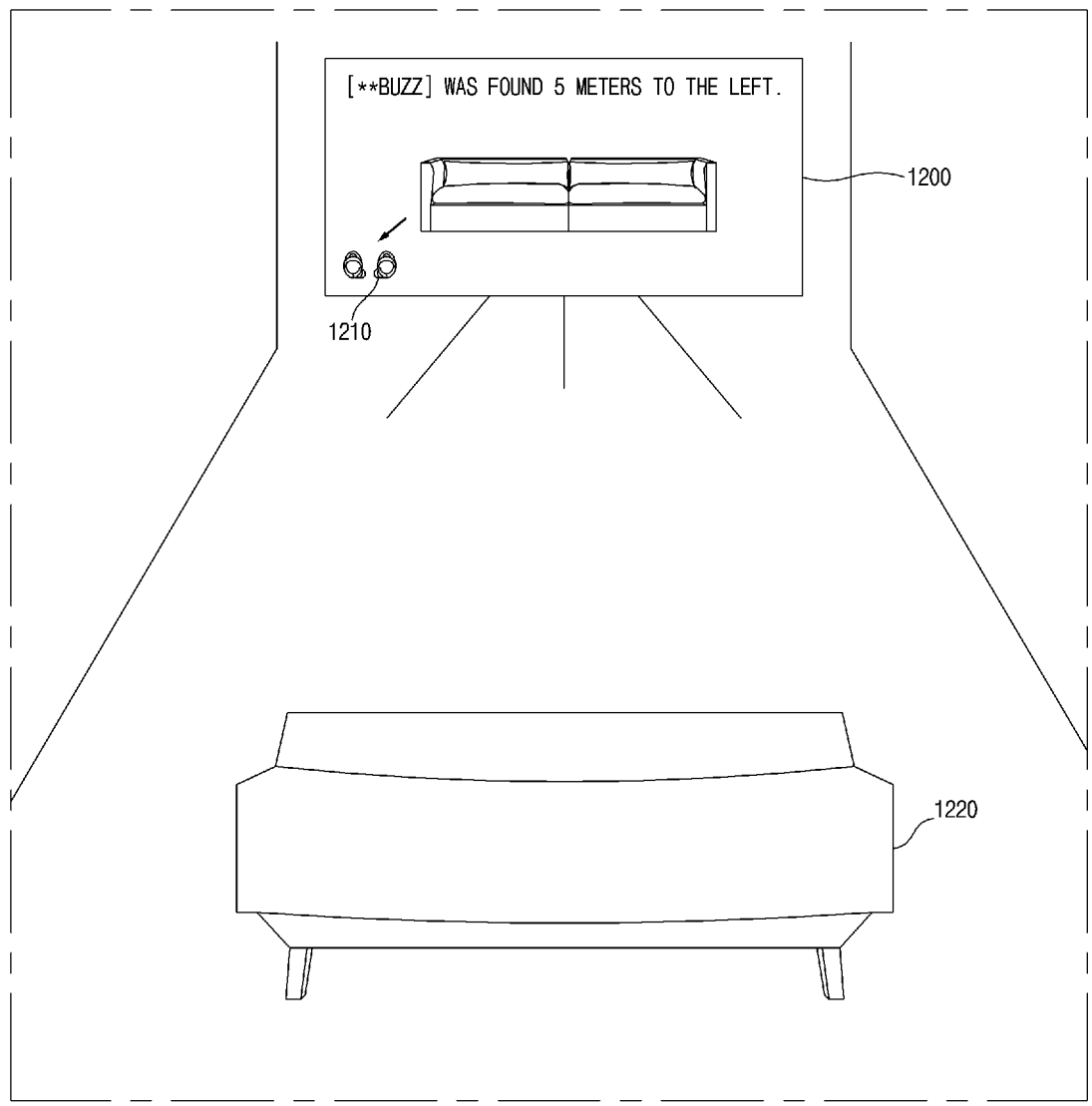
FIG. 12 illustrates a screen of an electronic device, according to an embodiment.

FIG. 12 illustrates a screen of an electronic device, according to an embodiment.

According to an embodiment, an electronic device 1200 (e.g., an electronic device 200 of FIG. 2) may be and/or may include a TV. The electronic device 1200 may provide a user with a location of an accessory device 1210 (e.g., an accessory device 250 of FIG. 2 (e.g., a wireless earphone)) on a display (e.g., a display module 160 of FIG. 1).

According to an embodiment, the electronic device 1200 may receive an advertising packet from the accessory device 1210. The electronic device 1200 may display the location of the accessory device 1210 on the display based on the advertising packet. For example, the electronic device 1200 may represent the location of the accessory device 1210 with respect to a previously disposed object 1220.

According to an embodiment, when the electronic device 1200 is a friend device, the electronic device 1200 may decrypt at least a portion (e.g., rich data) of the advertising packet. The rich data included in the advertising packet may be similar to and/or the same as the rich data described with reference to FIG. 3. The electronic device 1200 may display a more accurate location (e.g., having a lower error range) of the accessory device 1210 on the display based on the rich data, than a location not based on the rich data. For example, the electronic device 1200 may further display a movement path when the accessory device 1210 is in a pairing state with an external electronic device (e.g., an external electronic device 260 of FIG. 2). For another example, the electronic device 1200 may further display contact information of an owner of the accessory device 1210 based on the rich data.

Although various embodiments of the present disclosure have been illustrated and described above, the present disclosure is not limited to the specific embodiments as described above, and various modifications may be made by those skilled in the art without departing from the scope of the present disclosure as claimed in the appended claims.

What is claimed is:

1. An electronic device, comprising:
    a wireless communication circuit;
    a memory storing instructions;
    a display; and
    a processor communicatively coupled to the wireless communication circuit, the memory, and the display,
    wherein the processor is configured to execute the instructions to:
        receive, from at least one server through the wireless communication circuit, a first decryption key and store the first decryption key in the electronic device;
        receive, from an external device through the wireless communication circuit, an advertising packet, at least one portion of the advertising packet being encrypted with a first encryption key;
        decrypt the at least one portion of the advertising packet with the first decryption key; and
        transmit, to the at least one server through the wireless communication circuit, information comprised in the decrypted advertising packet,
    wherein the first decryption key corresponds to the first encryption key,
    wherein the advertising packet includes device information of the external device and encrypted additional information associated with the external device, the device information of the external device is not encrypted,
    based on the encrypted additional information not being decrypted with the first decryption key, transmit, to the at least one server through the wireless communication circuit, location information of the electronic device and the device information, and
    based on the encrypted additional information being decrypted with the first decryption key, transmit, to the at least one server through the wireless communication circuit, the location information of the electronic device and the device information and display, on the display, at least portion of the additional information decrypted using the first decryption key.

2. The electronic device of claim 1, wherein the processor is further configured to execute the instructions to:
    receive, from the at least one server, a second encryption key associated with the external device;
    encrypt the location information of the electronic device and the device information with the second encryption key; and
    transmit, to the at least one server, the encrypted location information of the electronic device and the encrypted device information.

3. The electronic device of claim 1, wherein the processor is further configured to execute the instructions to:
    transmit, to the at least one server, information associated with the electronic device with the location information of the electronic device and the device information.

4. The electronic device of claim 2, wherein:
    the first encryption key and the first decryption key are symmetric keys, and
    the second encryption key is a public key.

5. The electronic device of claim 1,
    wherein the processor is further configured to execute the instructions to:
        based on the encrypted additional information being decrypted with the first decryption key, transmit, to the at least one server through the wireless communication circuit, the at least portion of the additional information decrypted using the first decryption key.

6. The electronic device of claim 1, further comprising:
    a sound output device,
    wherein the processor is further configured to execute the instructions to:
        audibly provide, using the sound output device, at least one of the device information, the location information of the electronic device and the at least portion of the additional information.

7. An electronic device, comprising:
    a wireless communication circuit;
    a memory storing instructions; and
    a processor communicatively coupled to the wireless communication circuit and the memory,
    wherein the processor is configured to execute the instructions to:
        establish a connection with a first external device;
        onboard the first external device to at least one server;
        register, with the at least one server, a second external device meeting a friend condition;
        request, to the first external device through the connection, a first decryption key;

transmit, to the second external device through the at least one server, the first decryption key received from the first external device; and receive, from the at least one server, location information of the second external device, and information comprised in an advertising packet that has been decrypted using the first decryption key by the second external device, after the connection is released, wherein the advertising packet includes device information of the first external device and additional information associated with the first external device, and wherein the device information is not encrypted and the additional information is encrypted with a first encryption key, based on the encrypted additional information being decrypted using the first decryption key by the second external device, receive, from the at least one server through the wireless communication circuit, the location information of the second external device and the device information, and based on the encrypted additional information being decrypted using the first decryption key by the second external device, receive, from the at least one server through the wireless communication circuit, the location information of the second external device, the device information and at least portion of the additional information decrypted by the second external device.

8. The electronic device of claim 7, wherein the processor is further configured to execute the instructions to:
receive, from the at least one server, information associated with the second external device with the location information of the second external device and the at least portion of the additional information decrypted by the second external device.

9. The electronic device of claim 7, wherein the location information of the second external device is encrypted with a second encryption key.

10. The electronic device of claim 9, wherein:
the first decryption key and the first encryption key are symmetric keys, and
the second encryption key is a public key.

11. The electronic device of claim 7, wherein the processor is further configured to execute the instructions to:
determine that the second external device meets the friend condition, based on the second external device accessing a same access point (AP) as the electronic device, when onboarding the first external device to the at least one server.

12. The electronic device of claim 7, wherein the processor is further configured to execute the instructions to:
determine that the second external device meets the friend condition, based on the second external device being at a predetermined location.

13. The electronic device of claim 12, wherein the processor is further configured to execute the instructions to:
determine the predetermined location based on at least one of a user account and a location of the electronic device.

14. The electronic device of claim 7, wherein the processor is further configured to execute the instructions to:
determine that the second external device meets the friend condition, based on the second external device being authenticated based on a certificate.

15. The electronic device of claim 8, further comprising:
a display,
wherein the processor is further configured to execute the instructions to:

display, on the display, at least one of the device information, the location information of the second external device and the at least portion of the additional information decrypted using the first decryption key.

16. An electronic device, comprising:
a wireless communication circuit;
a memory storing instructions; and
a processor communicatively coupled to the wireless communication circuit and the memory,
wherein the processor is configured to execute the instructions to:
determine that a first external device meets a first condition;
onboard a second external device based on an onboarding request received from a third external device;
receive, from the third external device through the wireless communication circuit, a first decryption key;
transmit, to the first external device through the wireless communication circuit, the first decryption key; and
receive, from the first external device through the wireless communication circuit, location information of the first external device and information comprised in an advertising packet, at least a portion of the advertising packet having been decrypted using the first decryption key,
wherein the advertising packet includes device information of the second external device and encrypted additional information associated with the second external device, the device information of the second external device is not encrypted,
based on the encrypted additional information not being decrypted using the first decryption key by the first external device, receive, from the first external through the wireless communication circuit, the location information of the first external device and the device information, and
based on the encrypted additional information being decrypted using the first decryption key by the second external device, receive, from first external through the wireless communication circuit, the location information of the first external device, the device information and at least portion of the additional information decrypted by the first external device.

17. The electronic device of claim 16, wherein the processor is further configured to execute the instructions to:
transmit, to the first external device, an encryption key in response to a first request of the first external device; and
receive, from the first external device, the location information of the first external device, the device information and the at least portion of the additional information encrypted with the encryption key.

18. The electronic device of claim 17, wherein the processor is further configured to execute the instructions to:
receive, from the first external device, information associated with the first external device with the location information of the first external device and the at least portion of the additional information.

19. The electronic device of claim 18, wherein the processor is further configured to execute the instructions to:
transmit, to the third external device, at least one of the information associated with the first external device, the location information of the first external device, and the at least portion of the additional information.

20. The electronic device of claim 16, wherein the processor is further configured to execute the instructions to:
    register, as a friend device, the first external device meeting the first condition.

* * * * *